United States Patent
Danielson et al.

(10) Patent No.: US 12,355,828 B2
(45) Date of Patent: Jul. 8, 2025

(54) SYSTEMS AND METHODS FOR MANAGING SHARING OF A VIDEO IN A COLLABORATION SESSION

(71) Applicant: LIVEARENA TECHNOLOGIES AB, Täby (SE)

(72) Inventors: Magnus Danielson, Sollentuna (SE); Andreas Björkman, Täby (SE)

(73) Assignee: LiveArena Technologies AB, Stockholm (SE)

( * ) Notice: Subject to any disclaimer, the term of this patent is extended or adjusted under 35 U.S.C. 154(b) by 0 days.

(21) Appl. No.: 18/983,438

(22) Filed: Dec. 17, 2024

(65) Prior Publication Data
US 2025/0119461 A1 Apr. 10, 2025

Related U.S. Application Data

(63) Continuation of application No. PCT/SE2023/051311, filed on Dec. 27, 2023.

(30) Foreign Application Priority Data
Apr. 14, 2023 (SE) .................................... 2350439-2

(51) Int. Cl.
*H04L 65/1089* (2022.01)
*G06F 3/14* (2006.01)
(Continued)

(52) U.S. Cl.
CPC ........ *H04L 65/1089* (2013.01); *G06F 3/1454* (2013.01); *H04L 12/1831* (2013.01); *H04L 65/613* (2022.05); *H04L 65/80* (2013.01)

(58) Field of Classification Search
CPC ............. H04L 65/1089; H04L 12/1831; H04L 65/613; H04L 65/80; G06F 3/1454
See application file for complete search history.

(56) References Cited

U.S. PATENT DOCUMENTS

| 6,034,731 A | 3/2000 | Hurst, Jr. |
| 6,148,135 A | 11/2000 | Suzuki |

(Continued)

FOREIGN PATENT DOCUMENTS

| CN | 110753202 A | 2/2020 |
| EP | 2060104 A1 | 5/2009 |
| EP | 2355496 A1 | 8/2011 |

OTHER PUBLICATIONS

Swedish Search Report dated Nov. 8, 2023.
(Continued)

*Primary Examiner* — Stella L. Woo
(74) *Attorney, Agent, or Firm* — Noréns Patentbyrå AB

(57) ABSTRACT

A method and a system for managing sharing of a video in a collaboration session are disclosed. A sharing function obtains (B122) a synchronization time stamp of an audio frame of the collaboration session, wherein the audio frame is going to be used for synchronizing the shared video stream with the collaboration session. The sharing function determines, based on a video frame rate difference between the desired frame rate and a source frame rate of the video file, whether more, less or same number of video frames as in the video file are needed in the shared video stream. The sharing function iteratively retrieves (B140) video frames from the video file stored in the storage function (140). The sharing function provides (B160), by the sharing function (112), the shared video stream by sending said one or more generated video frames to the video communication service (110). The video communication service provides (B174), the shared video stream to the two client devices participating in the collaboration session.

4 Claims, 16 Drawing Sheets

(51) Int. Cl.
*H04L 12/18* (2006.01)
*H04L 65/613* (2022.01)
*H04L 65/80* (2022.01)

(56) References Cited

U.S. PATENT DOCUMENTS

| | | | |
|---|---|---|---|
| 6,272,127 B1 | 8/2001 | Golden et al. | |
| 7,143,432 B1 | 11/2006 | Brooks et al. | |
| 7,996,566 B1 | 8/2011 | Sylvain et al. | |
| 11,349,893 B1 | 5/2022 | Iyer et al. | |
| 12,069,320 B1* | 8/2024 | Danielson | H04N 21/23406 |
| 2003/0236792 A1 | 12/2003 | Mangerie et al. | |
| 2005/0044499 A1 | 2/2005 | Allen et al. | |
| 2005/0190872 A1 | 9/2005 | Seong et al. | |
| 2007/0067480 A1 | 3/2007 | Beek et al. | |
| 2011/0310216 A1* | 12/2011 | Lee | H04N 19/34 |
| | | | 375/E7.126 |
| 2012/0069137 A1 | 3/2012 | Thapa | |
| 2012/0092443 A1 | 4/2012 | Mauchly | |
| 2012/0140018 A1 | 6/2012 | Pikin et al. | |
| 2013/0064522 A1 | 3/2013 | Touma | |
| 2013/0159822 A1 | 6/2013 | Grossman et al. | |
| 2014/0153909 A1 | 6/2014 | MacInnis et al. | |
| 2014/0168354 A1* | 6/2014 | Clavel | H04N 7/15 |
| | | | 348/14.09 |
| 2015/0037003 A1* | 2/2015 | Fastige | G11B 27/30 |
| | | | 386/241 |
| 2016/0316174 A1* | 10/2016 | Whynot | H04N 7/152 |
| 2017/0148488 A1 | 5/2017 | Li et al. | |
| 2018/0012619 A1 | 1/2018 | Ryan et al. | |
| 2018/0132011 A1 | 5/2018 | Shichman et al. | |
| 2021/0337247 A1 | 10/2021 | Van Veldhuisen et al. | |
| 2022/0374585 A1 | 11/2022 | Wang et al. | |
| 2023/0198789 A1* | 6/2023 | Springer | G06F 9/547 |
| | | | 709/204 |

OTHER PUBLICATIONS

Singh, R, "3 Ways to share video files or YouTube videos in Zoom Meeting on Phone & PC", Gadgets to use (2022) URL: https://web.archive.org/web/20220122024928/https://gadgetstouse.com/blog/2021/06/28/share-video-files-or-youtube-videos-in-zoom-meeting/.
International search report and written opinion issued by the ISA (Swedish Intellectual Property Office) on Mar. 4, 2024.
Swedish search report and office action issued by the Swedish Intellectual Property Office on Feb. 23, 2024.
Swedish search report and office action issued by the Swedish Intellectual Property Office on Mar. 4, 2024.
International search report and written opinion issued by the ISA (Swedish Intellectual Property Office) on Feb. 23, 2024.
International search report and written opinion issued by the ISA (Swedish Intellectual Property Office) on Jan. 10, 2024.
Final office action (intention to grant) issued by the Swedish Intellectual Property Office on Nov. 29, 2024.
3 Ways to share video files or YouTube videos in Zom meeting on phone & PC; Ritik Singh.

* cited by examiner

SYSTEMS AND METHODS FOR MANAGING SHARING OF A VIDEO IN A COLLABORATION SESSION

TECHNICAL FIELD

At least some embodiments herein relate to video communication systems, such as video conference systems, video collaboration systems, video communication services, collaboration services or the like. The video communication systems can facilitate collaboration between a number of participants through a collaboration session. Moreover, at least some embodiments relate to generation of video, such as video streams, video files, and the like.

According to multiple aspects herein, there is provided a system for managing content and/or a file, a related method as well as one or more related software functions. There is also provided systems and methods for generating video.

In particular, according to some aspects herein, there are provided methods for managing sharing of a video in a collaboration session with at least two client devices. According to further aspects herein, there is provided a method for managing a file, e.g. to convert it to a video.

BACKGROUND

There are many known digital video conference systems, such as Microsoft® Teams®, Zoom® and Google® Meet®, offering two or more participants to meet virtually using digital video and audio recorded locally and broadcast to all participants to emulate a physical meeting.

There is a general need to improve such digital video conference solutions, in particular with respect to quality of videos shared among participants within a meeting. Quality can refer to resolution, frame rate, stuttering, lagging or the like.

It may be desirable to produce one or several output digital video streams based on a number of input digital video streams by an automatic production process, and to provide such produced digital video stream or streams to one or several consuming entities.

In a common scenario, it may be that two participants connect to a known video communication service in order to collaborate in a session. In such session, the participants may relatively easy share content displayed on their respective devices, such as a computer or the like. However, when sharing video content, it may happen that the video lags, stutters or otherwise deteriorates video/audio experience for the user. This kind of disturbance is annoying to the participants and the video communication service may be perceived as less user-friendly and as having performance issues.

Another problem may be related to delays between when the user requests content, such as a video file, a presentation file, a document file, a spreadsheet file, or the like, to be shared and when the content is actually shared among participants, such as devices or the like, in an ongoing collaboration session.

Furthermore, there is a general need to improve such digital video conference systems, in particular with respect to production of viewed content, such as what is shown to whom at what time, and via what distribution channels.

For instance, some systems automatically detect a currently talking participant, and show the corresponding video feed of the talking participant to the other participants. In many systems it is possible to share graphics, such as the currently displayed screen, a viewing window or a digital presentation. As virtual meetings become more complex, however, it has become more difficult for the service to know which of all currently available information to show to which participant at a given point in time.

In other examples a presenting participant moves around on a stage while talking about slides in a digital presentation. The system then needs to decide whether to show the presentation, the presenter or both, or to switch between the two. In many other situations, various automatic production decisions can be made by the system regarding how to put together a shared video stream to be consumed by one or several of participants and/or external entities.

Hence, it may be desirable to automatically produce one or several output digital video streams based on a number of input digital video streams by an automatic production process, and to provide such produced digital video stream or streams to one or several consuming entities.

However, in many cases it is difficult for a dynamic conference screen layout function or other automated production function to select what information to show, due to a number of technical difficulties facing such digital video conference systems.

SUMMARY

An object may be to eliminate, or at least reduce, one or more of the abovementioned disadvantages and/or problems.

This object, and possibly other objects, is achieved by one or more of the aspects as set forth herein.

According to a first aspect, there is provided a method, performed by a system, according to the first item in the appended listing of examples according to the first aspect.

As an example, thanks to that the system iteratively retrieves the video frames, e.g. in a frame-by-frame manner, from the storage function, the video to be shared does not need to rely on a connection towards a client device participating in the collaboration session. Instead, retrieval depends on a connection to the storage function, such as a cloud storage or the like. Since cloud storages, aka the storage function, are designed to be available at all times, such connection is generally highly reliable and has a high capacity, e.g. in terms of bandwidth. Moreover, the video's frames, e.g. the individual video frames, are iteratively retrieved from the storage function and processed subsequently, e.g. the generation and provision of video frames to be sent as the shared video stream to the video communication service. As a result, memory requirements for the system, e.g. the central server, are reduced, e.g. as compared to when the entire file representing the video is required to be stored and managed by the central server. In at least some embodiments herein, the video frames are processed one by one and typically only a limited number of video frames need to be kept in the memory of the system at any given time.

In addition, a consequence of the iterative retrieval of video frames is that the processing of the frames may begin as soon as at least one complete video frame has been retrieved, such as received and/or decoded, or the like. Thereby, such embodiments cater for low delay to start the video, since the system does not have to wait for the entire file, or even for chunks of the file, to be received.

An advantage is, hence, that a user, participating in the collaboration session via their client device, may view the video shared via the video communication service while experiencing less, or even no, stuttering and less delay. User-friendliness is thus improved. A further advantage, according to some embodiments, is that the shared video may be provided with the desired resolution and the desired frame rate. For example, the desired frame rate and resolution may be adapted to the client devices, e.g. to the client devices' technical capabilities and/or service subscription level as will be described in the detailed description.

Additionally, various embodiments of the first aspect are described in the following. There is provided a method, performed by a system, for managing sharing of a video in a collaboration session, in which at least two client devices are participating, wherein the system comprises the two client devices and a central server capable of hosting the collaboration session, wherein a video file, representing the video and being stored in a storage function, is accessible by the central server, wherein the video is to be shared as a shared video stream with a desired resolution and a desired frame rate, wherein the method comprises:

receiving, by the central server, a request for sharing of the video in the collaboration session, obtaining, by the central server, a synchronization time stamp of an audio frame, relating to the collaboration session, to be used for synchronizing the shared video stream with the collaboration session, determining, by the central server and based on a video frame rate difference between the desired frame rate and a source frame rate of the video file, whether more, less or same number of video frames as in the video file are needed in the shared video stream, setting up, by the central server, a buffer for provision of the shared video stream to the collaboration session, wherein the buffer is capable of buffering at the most a limited number of video frames that corresponds to a time interval of less than one second, iteratively retrieving, by the central server, video frame by video frame of the video file, and for each video frame, the method comprises:

generating, by the central server, zero, one or more video frames according to the determination step based on said each iteratively retrieved video frame, while setting a respective time stamp of said one or more generated video frames based on the synchronization time stamp, wherein said one or more generated frames have the desired resolution and the respective time stamp corresponds to the desired frame rate, wherein the method comprises:

providing, by the central server and to the two client devices participating in the collaboration session, the shared video stream by inserting said one or more generated video frames into the buffer.

In some embodiments, the method comprises:

obtaining, by the central server, information about the desired resolution and the desired frame rate for a shared video stream representing the video to be shared.

In some embodiments, the method comprises:

in a further determination step, determining, by the central server and based on a further video frame rate difference between a further desired frame rate and a source frame rate of the video file, whether more, less or same number of video frames as in the video file are needed in the shared video stream, wherein the method comprises, for each iteratively retrieved video frame:

in a further generation step, generating, by the central server, zero, one or more video frames according to the further determination step based on said each iteratively retrieved video frame, while setting a further respective time stamp of said one or more generated video frames based on the synchronization time stamp, wherein said one or more generated frames have the further desired resolution and the respective time stamp corresponds to the further desired frame rate, providing, by the central server, the second video stream by sending the respective further video frame to a destination function.

In some embodiments, the shared video stream may have been processed by a production function to obtain a produced shared video stream, and wherein the second video stream has been processed by a further production function to obtain a produced second video stream.

In some examples, the method thus comprises, e.g. before the retrieval of video frames, after the generation of one or more generated video frames, or the like:

processing, by the production function, the video frames to obtain a produced shared video stream.

In some examples, the method thus comprises, e.g. before the retrieval of further video frames, after the generation of further one or more generated video frames, or the like:

processing, by the further production function, the video frames to obtain a produced shared video stream.

The production function and the further production function may be different from each other.

In some embodiments, the method comprises:

obtaining an update message instructing the central server to set the desired video frame rate and the desired resolution according to information comprised in the message, whereby an updated desired video frame rate and an updated desired resolution is obtained.

According to a second aspect, there is provided a method, performed by a system, according to claim 1.

The present inventors have realized that one cause of the lagging and/or stuttering depends on optimizations in the client software for connecting to the video communication service. The optimizations may stem from the fact that users originally typically shared static content, such as documents, spreadsheets, presentations with slides, or the like. In order to perform well, also during rough conditions, such as high latency and low bandwidth conditions, known client software provides the share screen function with a limited frame rate and a limited resolution. A straight-forward solution would thus be to upgrade the client software with possibilities to allow higher frame rates and higher resolutions, e.g. as selected by the user. However, this would in many cases be devastating to the performance when sharing the static content during rough connectivity conditions, e.g. bad network, low bandwidth, etc.

Rather than updating the client software, the present inventors have thus provided a solution where the central server connects to the video communication service and shares the video, e.g. in any desired frame rate and any desired resolution, from a storage function with a highly reliable connection. In this manner, the embodiments herein allow sharing of a video in a user-friendly manner without, or almost without, any stuttering and/or lagging, while at the same time no trade-off between optimization for static content, such as slides/documents, or video is required. Beneficially, in at least some embodiments, the client software remains the same and only a plug-in or add-on, or similar, for the client software and a backend, cooperating with the add-on, are required. Moreover, the solution is very user-friendly since the operation and function of at least some embodiments herein is completely transparent to the user, e.g. the user does not need to indicate, e.g. to the client software, the addon or the like, whether a video is shared or a document is shared.

Additionally, various embodiments of the second aspect are described in the following. There is provided a method, performed by a system, for managing sharing of a video in a collaboration session, in which at least two client devices are participating, wherein the system comprises a video communication service capable of hosting the collaboration session, two client functions, executable on a respective one of the two client devices, two addon functions associated with a respective client function of said two client functions, an addon-backend function configured to cooperate and communicate with the two addon functions, and a sharing function configured to cooperate and communicate with the addon-backend function and to participate in the collaboration session. The two client functions may be configured to communicate and/or cooperate with the video communication service. A video file, representing the video and being stored in a storage function, is accessible by the sharing function, wherein the video is going to be shared as a shared video stream with a desired resolution and a desired frame rate. The method comprises:

receiving, by the addon-backend function, a request for sharing of the video in the collaboration session, connecting the sharing function to the collaboration session, obtaining, by the sharing function, a synchronization time stamp of an audio frame of the collaboration session, wherein the audio frame is going to be used for synchronizing the shared video stream with the collaboration session, in a determination step, determining, by the sharing function and based on a video frame rate difference between the desired frame rate and a source frame rate of the video file, whether more, less or same number of video frames as in the video file are needed in the shared video stream, iteratively retrieving, by the sharing function, video frames from the video file stored in the storage function, and for each iteratively retrieved video frame, the method comprises:

generating zero, one or more video frames based on said each iteratively retrieved video frame according to the determination step, while setting a respective time stamp of said one or more generated video frames based on the synchronization time stamp, wherein said one or more generated frames have the desired resolution and the respective time stamp corresponds to the desired frame rate, wherein the method comprises:

providing, by the sharing function, the shared video stream by sending said one or more generated video frames to the video communication service, and providing, by the video communication service, the shared video stream to the two client devices participating in the collaboration session.

In some embodiments, the method comprises:

obtaining, by the central server, information about the desired resolution and the desired frame rate for a shared video stream representing the video is to be shared.

Furthermore, there is provided a sharing function configured for performing at least some of the operations performed by the sharing function in the methods herein.

According to a third aspect, there is provided a method, performed by a system, according to the first item in the appended listing of examples according to the third aspect.

In this manner, the video is linked to metadata associated with one or more points in time of the video. Thus, it is possible to fast-forward, such as jump, skip, or the like, to a certain point in time in the video with which the metadata is associated. The metadata may represent an event, such as a mouse-click, a slide change, or the like. This means that the metadata makes it easy to e.g. find the certain point in time of the video at which the event occurred, e.g. a certain page, a slide or the like of the source file is represented in the video at the certain point in time.

In the context of video editing and/or production, an advantage may be that portions of the video representing the content of the file may be found easily, e.g. by an automated production function, or the like.

According to further embodiments, sometimes even without the use of meta data, an advantage may be that possibly at least partly static content, such as a website, a document file, or the like, may be shared as a video fed to the video communication service, and also distributed to the participants. In this manner, the distribution of the content, to the participants in a collaboration session, may rely on, and take advantage of, the video communication service. In contrast thereto, when a web page is shared in a collaboration session using a so called "stage view" if Teams is used, the participants' devices load the web page, and any content therein, such as a video, directly from the webserver hosting the web page. Consequently, the contents of the web page is served from the webserver into the stage view and the video communication service is effectively, but unfortunately, bypassed. As a result, such sharing may not rely on or take advantage of any benefits provided by the video communication service, such as its capabilities for distribution of video content.

Additionally, various embodiments of the third aspect are described in the following. There is provided a computer-implemented method for managing a file, wherein the method comprises:

opening the file by means of a rendering function to render at least a portion of the file as an image, obtaining one or more event messages, wherein the method comprises, for each event message of said one or more event messages:

obtaining, from the rendering function, a respective image for each event message, wherein the respective image represents a rendered portion of the file, wherein the respective image is associated with a sequence indication, generating metadata based on the event message and the sequence indication, providing the metadata, and providing a video comprising a set of images, wherein the set of images comprises the respective image for each event message, wherein the video is a representation of the file.

In some embodiments, the method is performed by a client device, wherein a system comprises the client device and a video communication service, wherein the video communication service hosts a collaboration session joined by the client device.

In some embodiments, said one or more event messages is received from the rendering function, and wherein said one or more event messages relates to changes in the image rendered by the rendering function, e.g. due to input events providable by a user-input device.

In some embodiments, the method comprises:
   simulating said one or more event messages by generating input events that change the image rendered by the rendering function.
In some embodiments, input events originate from actual interaction with the rendered file by the user using the user-input device, such as a mouse, a keyboard, a trace pad, or the like.
In some embodiments, wherein the method comprises:
   repeatedly capturing images by the rendering function, and
   when a difference is detected between two consecutively captured images, generating an event message of said one or more event messages, wherein the event message indicates that the two consecutively captured images are different from each other.
In some embodiments, the method comprises:
   repeatedly capturing images by the rendering function, and
   when a difference is not detected between two consecutively captured images, generating an event message of said one or more event messages, wherein the event message indicates that the two consecutively captured images are similar to each other.
In some embodiments, said one or more event messages comprises an indication to start a sequence of repeatedly capturing images by means of the rendering function or an indication to stop the repeatedly capturing of images by means of the rendering function, wherein the method comprises:
   when obtaining the indication to start, repeatedly capturing images by means of the rendering function, and
   generating metadata based on the event message and a respective sequence indication for each captured image, until the indication to stop is obtained.
In some embodiments, the method comprises:
   receiving an audio stream of the collaboration session from the video communication service,
   detecting a key word in the audio stream, and
   generating an event message of said one or more event messages based on the key word.
There is provided a computing function configured for performing at least some of the operations performed by the computing function herein.
According to yet further aspects, the aforementioned object, or other objects, are achieved by computer programs and computer program carriers corresponding to the aspects above.

BRIEF DESCRIPTION OF THE DRAWINGS

The various aspects of the embodiments disclosed herein, including particular features and advantages thereof, will be readily understood from the following detailed description and the accompanying drawings, which are briefly described in the following.

DETAILED DESCRIPTION

Figure 1:
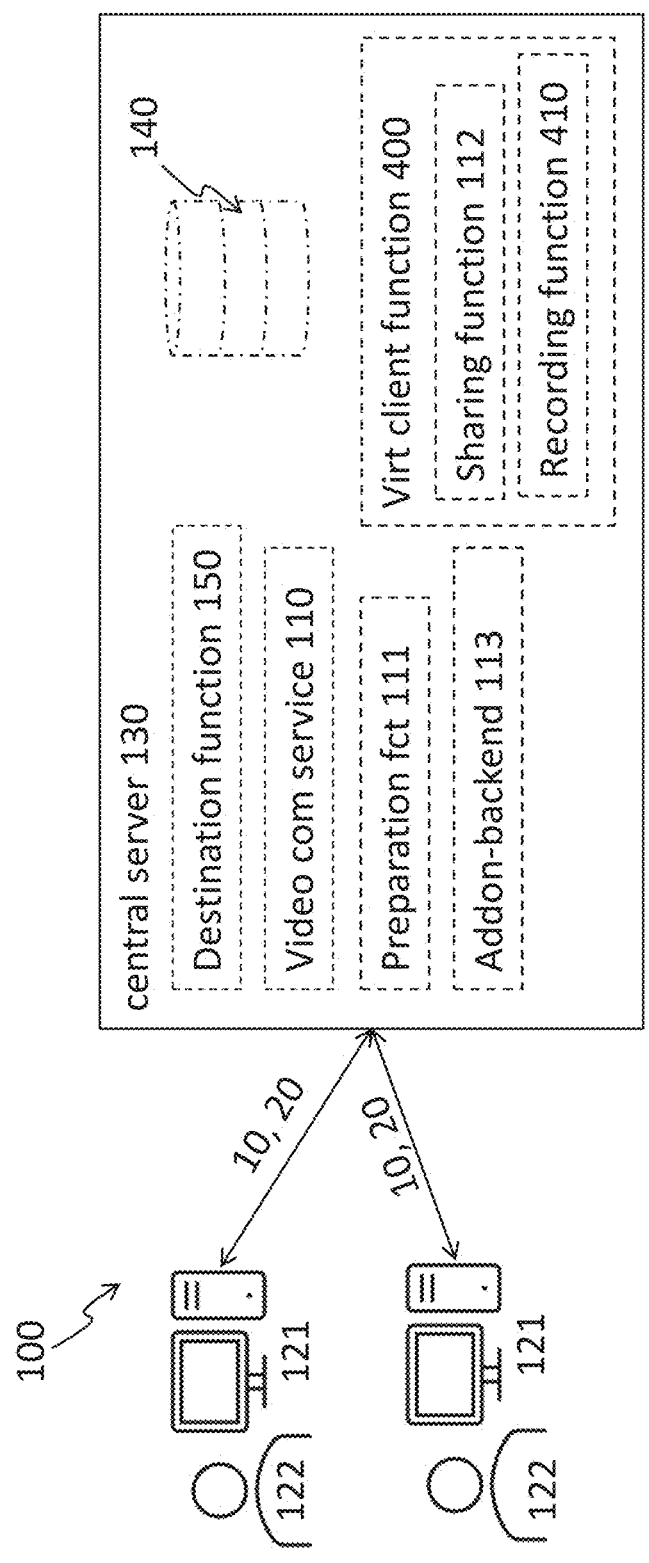
FIG. 1, FIG. 2, FIG. 3a, and FIG. 3b are schematic overviews of exemplifying systems according to various embodiments herein.

Throughout the following description, similar reference numerals have been used to denote similar features, such as functions, actions, modules, circuits, parts, items, elements, units or the like, when applicable. In the Figures, features that appear in some embodiments are sometimes indicated by dashed lines.

Terminology

As used herein, the term "central server" or "function" is a computer-implemented functionality that is arranged to be accessed in a logically centralised manner, such as via a well-defined API (Application Programming Interface). The functionality of such a central server may be implemented purely in computer software, or in a combination of software with virtual and/or physical hardware. It may be implemented on a standalone physical or virtual server computer or be distributed across several interconnected physical and/or virtual server computers. The physical or virtual hardware that the functionality of the central server, in other words that computer software defining the functionality of the central server, runs on may comprise a per se conventional CPU, a per se conventional GPU, a per se conventional RAM/ROM memory, a per se conventional computer bus, and a per se conventional external communication functionality such as an internet connection.

As used herein, the term "video communication service" refers to a video conference service, a video communication function, a collaboration service, such as Microsoft Teams, Google Meet, Skype, Slack or the like. The rights of the names of these services belong to the respective registered owner. Such video communication service is able to provide, such as host, run or the like, a collaboration session, such as a video conference meeting, an online meeting, or the like.

As used herein, the terms "video communication" or "collaboration session" may have been used interchangeably to refer to an interactive, digital communication session involving at least two, preferably at least three or even at least four, video streams, and preferably also matching audio streams that are used to produce one or several mixed or joint digital video/audio streams that in turn is or are consumed by one or several consumers (such as participant clients of the discussed type), that may or may not also be contributing to the video communication via video and/or audio. Such a video communication can be real-time, with or without a certain latency or delay. At least one, preferably at least two, or even at least four, participants to such a video communication is/are involved in the video communication in an interactive manner, both providing and consuming video/audio information. The collaboration session may be a video communication, a video communication session, a video collaboration session, a digital video communication, a digital meeting, a digital video meeting, a video conference, an online video meeting, an online digital conference or the like, provided by the video communication service. In many embodiments, the collaboration session is interactive across several different participants, in the sense that video and/or audio information is distributed in a bidirectional manner between different participants.

As used herein, the term "client device", "participating client" or the like, may refer to a mobile phone, a user equipment, a cellular phone, a Personal Digital Assistant (PDA) equipped with radio communication capabilities, a smartphone, a laptop or personal computer (PC) equipped with an internal or external mobile broadband modem, a tablet PC with radio communication capabilities, a portable electronic radio communication device, or similar.

As used herein, the term "software library for video handling", or the like, may refer to any commercially available, or proprietary non-publicly available, software library that provides ready-to-use routines, functions, procedures, or the like, for handling a video in any suitable format. The handling may include colour conversion, resolution adjustment, frame rate adjustment, brightness adjustment, contrast adjustment, compression, decompression, format conversion or the like. The software library may be exemplified by FFmpeg, VideoLan, Handbrake, PotPlayer, Amazon Web Services (AWS) Elemental MediaTailor, Compressor, Videojs, Amazon Kinesis Video Streams, Video Converter Ultimate, or the like, where any existing rights to these belong to their respective owner. Normally, even if such a library exists in several different versions across time, it would be well-defined as a technical entity.

As used herein, the term "shared video stream" may refer to that such "shared video stream" is to be sent to the video communication service for distribution among one or more participants, such as client devices, virtual clients, or the like, in a collaboration session.

As used herein, the term "produced video stream" may refer to that such "produced video stream" is generated from one or more collected and/or received videos, possibly in combination with an audio stream, subtitle information, metadata, and/or the like. The videos may be video streams and/or video files, or the like. The production may be fully or at least partly automatic and performed by a production function of the system based on available information.

This means that a shared video stream may also be a produced video stream, a produced video stream may also be a shared video stream, but not necessarily. Further, even though more rarely, a shared video stream does not have to be a produced video stream. Hence, the concepts of "shared video stream" and "produced video stream" are orthogonal.

As used herein, the term "primary stream", such as a primary video stream, a primary audio stream, or the like, refers to a stream that is provided, such as sent, or the like, to a production function, or the like. As described herein, the production function may obtain at least one primary stream, preferably two or more primary stream.

As used herein, the term "secondary stream", such as a secondary video stream, a secondary audio stream, or the like, refers to a stream that has been processed or produced by one or more production functions, or the like. As described herein, the production function may provide, such as generate, or the like, at least one secondary stream, but in some examples multiple secondary streams, with or without different delays as explained herein, may be produced by the production function, or a plurality of production functions. A secondary stream can be fed into a production function and then take on the capacity of a primary stream. In other words, production can be performed in more than one layer or iteration.

As used herein, the term "pattern" may refer to a detectable pattern in an audio and/or video stream and/or a detectable pattern that is detected in at least two audio and/or video streams, e.g. two simultaneous voices, same object in the videos, but different angles, or the like.

FIG. 1 to FIG. 3a, 3b illustrate examples of how the system 100 may be implemented, e.g. according to various configurations. Features of one example may be readily combined with one or more other features of the other examples when reasonably possible.

FIG. 1 illustrates an exemplifying system 100 according to at least some aspects herein. According to some embodiments the system 100 is configured to perform one or more exemplifying methods for managing sharing of video in a collaboration session, e.g. sharing the video as a digital video stream, such as a shared digital video stream, distributed in the collaboration session. In other examples, the system 100 may be configured for managing a file, such as a document file, a presentation file, a portable document format (pdf) file, a spreadsheet file, a webpage, a html-file, or the like. The file can be shared in a collaboration session, but not necessarily.

The system 100 may comprise a central server 130, which may be configured to perform one or more actions of the exemplifying methods described herein.

The system 100 may comprise a video communication service 110, but the video communication service 110 may also be external to the system 100 in some embodiments. Furthermore, the central server 130 may or may not comprise the video communication service 110. The video communication service 110 is a computer function in the same sense as the central server 130. The central server 130 and the video communication service 110 are configured to communicate with each other, such as exchanging video and/or audio streams, messages, and/or any other kind of information. Accordingly, in some examples, the collaboration session may be provided, such as hosted or the like, by the central server 130, e.g. when the central server 130 comprises the video communication service 110. When the central server 130 does not comprise the video communication service 110, the video communication service 110 provides, such as hosts, or the like, the collaboration session.

The system 100 may comprise one or several participant client devices 121, but one, some or all participant client devices 121 may also be external to the system 100 in some embodiments. The term "participant client" may refer to a participating client device, such as a computer, a mobile phone, a cellular phone, a tablet Personal Computer (PC), a stationary computer, a portable computer, a laptop, or the like. Each of said participant client devices 121 may be a computer function in the same sense as the central server 130, with physical and/or virtual hardware that each participant client 121 runs on, in other words the computer software functionality defining the participant client 121, may also comprise a per se conventional CPU/GPU, a per se conventional RAM/ROM memory, a per se conventional computer bus, and a per se conventional external communication functionality such as an internet connection.

Each participant client device 121 also typically comprises or is in communication with one or more computer screens, arranged to display video content provided to the participant client device 121 as a part of an ongoing collaboration session; a loudspeaker, arranged to emit sound content provided to the participant client 121 as a part of said video communication; a video camera; and a microphone, arranged to record sound locally to a human participant 122 to said video communication, the participant 122 using the participant client 121 in question to participate in said video communication. The participant 122 may be a user, an operator, a film director, an influencer, a conference presenter, a teacher, or the like, which is participating, or about to participate, in the collaboration session.

Typically, the participant 122 operates one of the client devices 121, or even more than one client device. The other one of said at least two client device 121, may also be operated by a user, which typically is different from the user of the first mentioned client device 121. The first mentioned client device 121 may be referred to as a first client device associated with a first user. The other one of said at least two client devices 121 may be referred to as a second client device associated with a second user.

There may be only one, more than one, at least three, or even at least four participant client devices 121 used in one and the same collaboration session. For the purpose of sharing, e.g. a file, a video, or the like, it may be preferred that there are at least two client devices 121. Yet, at least some embodiments herein may be embodied with no or only at least one client device 121.

In some examples, there may be at least two different groups of participating client devices. Each of the participating clients may be allocated to such a respective group. The groups may reflect different roles of the participating clients, different virtual or physical locations of the participating clients and/or different interaction rights of the participating clients. For example, a first group of participating clients may have joined the collaboration session remotely each o the first group members using a respective participating client device and a second group of participating clients may be an audience that have joined the collaboration session, e.g. remotely, each using a participating client device that is common to all the individuals of the audience, where such participating client device is arranged to show, including video and/or audio, the collaboration session to the audience using one or more display devices, one or more speakers and/or one or more microphones. Each second group participant may alternatively use its own respective client device. Correspondingly, there may be three or more groups.

Various available such roles may be, for instance, "leader" or "conferencier", "speaker", "presenter", "panel participant(s)", "interacting audience" or "remote listener(s)". It shall be understood that even if these roles associate to a human user, the roles may be assigned in the client devices, or virtual client functions as the case may be, in order to allow the embodiments herein to make use of the roles. The roles may form the basis on which different groups as above are created, e.g. for a particular collaboration session.

Various available such physical locations may be, for instance, "on the stage", "in the panel", "in the physically present audience" or "in the physically remote audience".

A virtual location may be defined in terms of the physical location, but the virtual location may also involve a virtual grouping that may partly overlap with said physical locations. For instance, a physically present audience may be divided into a first and a second virtual group, and some physically present audience participants may be grouped together with some physically distant audience participants in one and the same virtual group.

Various available such interaction rights may be, for instance, "full interaction" (no restrictions), "can talk but only after requesting the microphone" (such as raising a virtual hand and/or an actual hand in a video conference service), "cannot talk but write in common chat" or "view and/or listen only". The interaction rights may apply with respect to the collaboration session, or one or more such collaboration session.

In some instances, each role defined and/or physical/virtual location may be defined in terms of certain predetermined interaction rights. In other instances, all participants having the same interaction rights form a group. Hence, any defined roles, locations and/or interaction rights may reflect various group allocations, and different groups may be disjoint or overlapping, as the case may be.

Hence, the groups, e.g. for a collaboration session, may be based on, correspond to and/or associated with one or more of the physical and/or virtual location, the interaction rights, the roles and the like.

As shown in FIG. 1, each of the participating clients 121 may constitute the source of a respective information (video and/or audio) stream 10, provided to the video communication service 110 by the participating client 121 in question as described. Each participating client 121 may also receive a stream 20, comprising one or more video and/or audio streams, in order to take part in the collaboration session. The streams 10 can be primary streams, whereas the streams 20 can be primary or secondary streams.

The system 100, such as the central server 130, may be further arranged to digitally communicate with, and in particular to send digital information to, a destination function 150, such as a virtual director, an automated directing and/or producing function or the like. The destination function 150 may be capable of editing a received video stream for display to a user, an audience or the like. The central server 130 may, or may not, comprise the destination function 150. For instance, a digital video and/or audio stream produced by the central server 130 may be provided continuously, in real-time or near real-time, to one or several destination functions 150. Again, the fact that the destination function 150 may be "external" means that the destination function 150 is not provided as a part of the central server 130, and/or that it is not a party to the said video communication. In other examples, the destination function 150 may be a presentation function arranged to present the video to an audience. In some examples, the destination function 150 may participate in, such as have joined as a participant, or the like, the collaboration session.

Unless stated otherwise, all functionality and communication herein are or can be provided automatically, digitally and/or electronically, effected by computer software executing on suitable computer hardware and communicated over a digital communication network or channel such as the internet.

Hence, in the system 100 configuration illustrated in FIG. 1, a number of participant client devices 121 take part in the collaboration session provided by the video communication service 110. Each participant client device 121 may hence have an ongoing login, session or similar to the video communication service 110, and may take part in one and the same ongoing collaboration session provided by the video communication service 110. In other words, the collaboration session is "shared" among the participant client devices 121 and therefore also by corresponding human participants 122.

The central server 130 can comprise a virtual client function 400, shown in FIG. 1 through FIG. 3b, that can be seen as an automatic participant client, being an automated client corresponding to participant clients 121 but not associated with a human participant 122. Instead, the automatic participant client 400, or virtual client function, is added as a participant client to the video communication service 110 to take part in the same collaboration session in the same or similar manner as the participant client devices 121 although the automatic participant client 400 typically is executing in the central server 130, e.g. on a virtual machine hosted by the central server 130. As an example, this may mean that the virtual client function 400 may run a program like the client function 125 or similar. Moreover, the automatic participant client can allow a program to access and/or control various data and/or functions within the automatic participant client, such as incoming and/or outgoing streams of audio and/or video or the like, respond to and/or act upon event messages or the like, send event messages or the like. This means that as such a participant client, the automatic participant client 400 is granted access to continuously produced digital video and/or audio stream(s) provided as a part of the ongoing collaboration session by the video communication service 110, and can be consumed by the central server 130 via the automatic participant client 400. Preferably, the automatic participant client 400 receives, from the video communication service 110, a common video and/or audio stream that is or may be distributed to each participant client 121; a respective video and/or audio stream provided to the video communication service 110 from each of one or several of the participant clients 121 and relayed, in raw or modified form, by the video communication service 110 to all or requesting participant clients 121; and/or a common time reference. As an example, the virtual client function 400 may be a so-called bot, that in turn can be realized by means of a docker container or the like.

Moreover, the central server 130 may comprise at least one software function, such as a preparation function 111, a sharing function 112, a recording function 410 and the like. The software functions are described in more detail below, e.g. in connection with the corresponding action(s). In some examples, the virtual client function 400 may comprise the sharing function 112 and the recording function 410. It is also possible that the sharing function 112 and/or the recording function 410 directly implement(s) the functionality of the virtual client function 400, which then may be seen as an integral part of the sharing function 112 and/or the recording function 410. Expressed differently, the sharing function 112 may be an automated client corresponding to participant client devices 121 but not associated with a human user. Instead, the automatic participant client 400 can be added as a participant client to the video communication service 110 to take part in the collaboration session in the same manner as the participant clients 121. As such a participant client, the sharing function 112 is then granted access to continuously produced digital video and/or audio stream(s) provided as a part of the ongoing session by the video communication service 110, and can be consumed by the sharing function 112 as being the automatic participant client. The sharing function 112 can be associated with the first and/or second aspects herein. Likewise, the recording function 410 may be an automated client corresponding to participant client devices 121 but not associated with a human user. Instead, the automatic participant client 400 can be added as a participant client to the video communication service 110 to take part in the same shared collaboration session as participant clients 121. While acting as such a participant client, the recording function 410 can be granted access to continuously produced digital video and/or audio stream(s) provided as a part of the ongoing session by the video communication service 110, that can be consumed by the recording function 410 as being the automatic participant client. The recording function 410 can be associated with the third aspect herein.

The central server 130 may also comprise, such as be arranged to connect to, include or the like, a storage function 140 configured to store videos to be shared by the central server 130. The storage function 140 may also be arranged to connect to a local or remote storage, a cloud storage, a disc drive, a hard drive, or the like. In some examples, the central server 130 may not necessarily comprise the storage function 140, e.g. the storage function 140 may be external to the central server 130.

Figure 2:
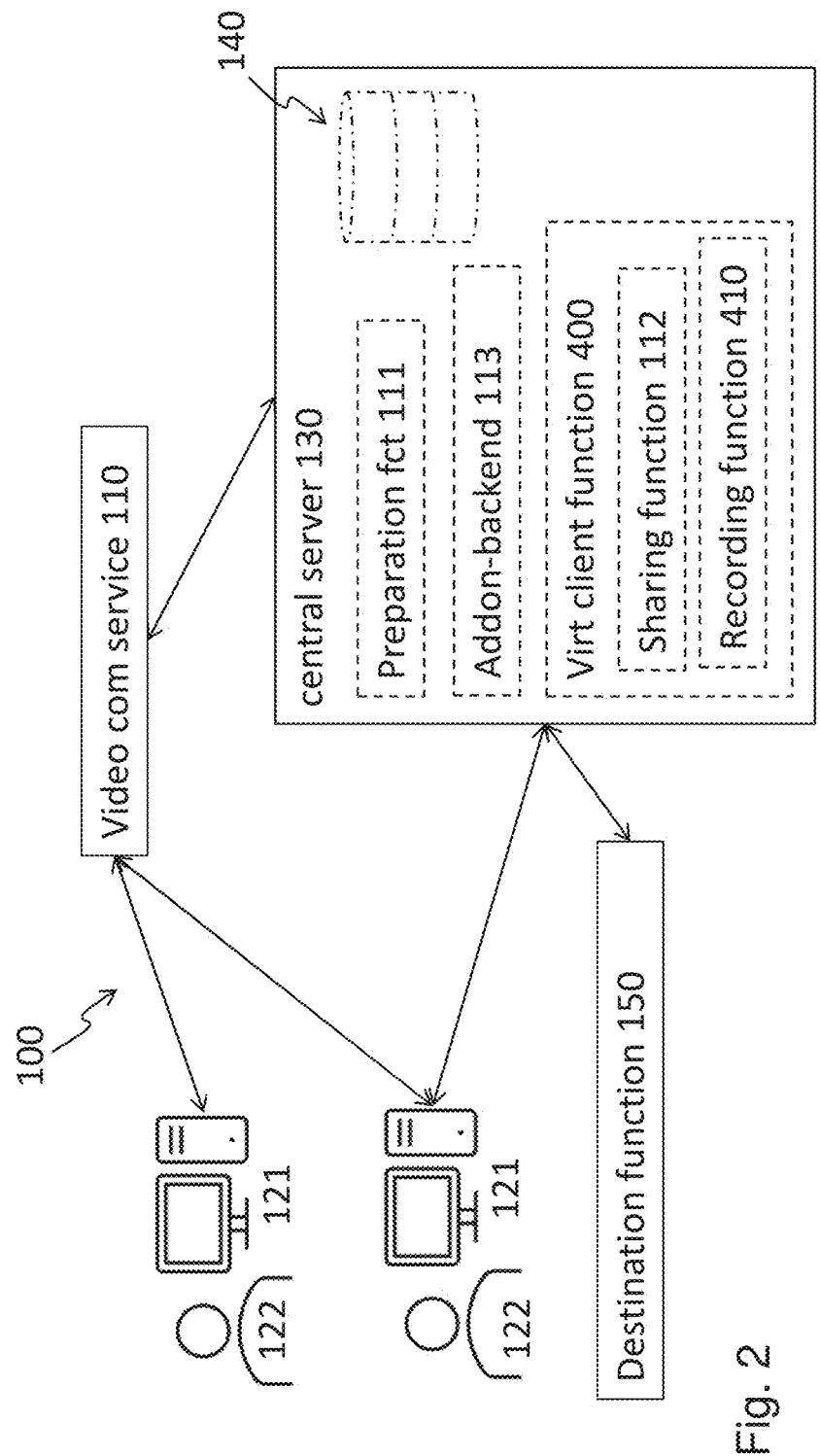

FIG. 2 is similar to FIG. 1, but in this example the video communication service 110 is shown as a separate computer software function that is not comprised in the central server 130. In this example, the destination function 150 is also shown as a separate function, but it may in other examples be included in the central server 130. The destination function 150 may be a production function as described herein, a presentation function or the like.

Figure 3A:
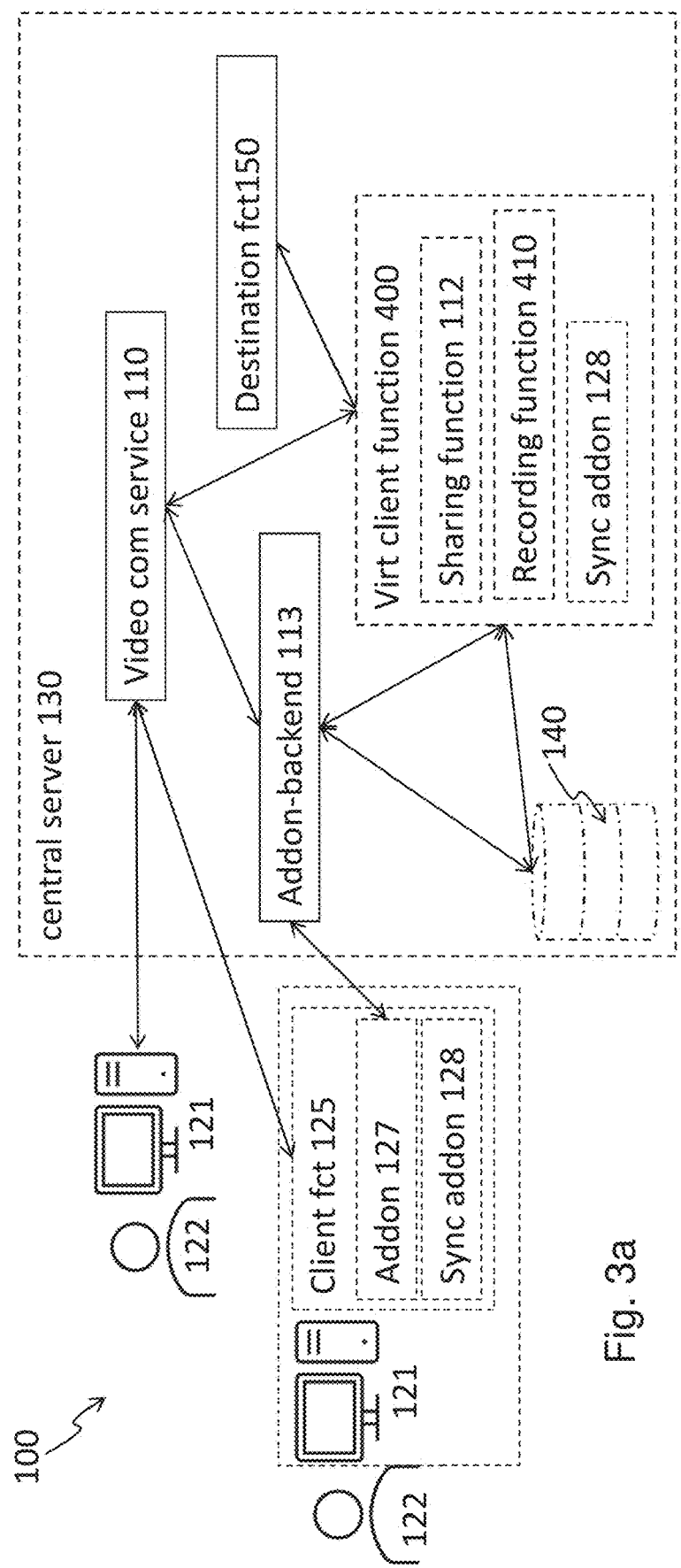

FIG. 3a is also similar to FIG. 1 and shows a further exemplifying configuration of the system 100. In this case, the various computer software functions within the central sever 130 are shown separated.

FIG. 3a also illustrates that each participant client device 121 is capable of running a respective client function 125, such as a participant function, a software application, an app, a program, a web application or the like. The respective client function 125 may be installed on the client, may be a web application that can be downloaded or cached, or the like. The respective client function 125 is configured to be able to join a collaboration session, hosted by the video communication service 110. Each participant client device 121 may hence have login credentials for a collaboration session or similar to the video communication service 110. In this way, each participant client device 121 may take part in the collaboration session. In other words, the collaboration session is shared among the participant client devices 121 and therefore also by corresponding users 122. The client function 125 is configured to communicate with and cooperate with the video communication service 110, e.g. in a known client-server context. For example, when using some known video conference software solutions, the user needs to run a dedicated client software on their device. The dedicated client software can be specific for the provider, e.g. a company, or the like, of the video communication service 110. As indicated above, the user needs to be registered with the video communication service 110 in order to be able to use it. Registration may require payment, or it may be free of charge.

When the user 122 sets up a collaboration session, the user may select one or more addon functions 127, referred to as "addon" for reasons of simplicity, to be initiated by the client function 125. Once the addon 127 is executing in client device 121, it may communicate with the client function 125 and/or an addon-backend function 113, which can then be specifically configured to cooperate with the addon 127.

In some examples, the addon-backend function 113 is further configured to initiate the sharing function 112 with appropriate initialization information, which enables the sharing function to communicate with the storage function 140 and the video communication service 110.

Although not shown in FIG. 1 to FIG. 3a, the central server 130 may comprise further functions, such as a production function, an automated production function, or the like. These functions, such as the production function, and the like, are further illustrated and described with reference to FIG. 3b and related Figures.

Figure 3B:
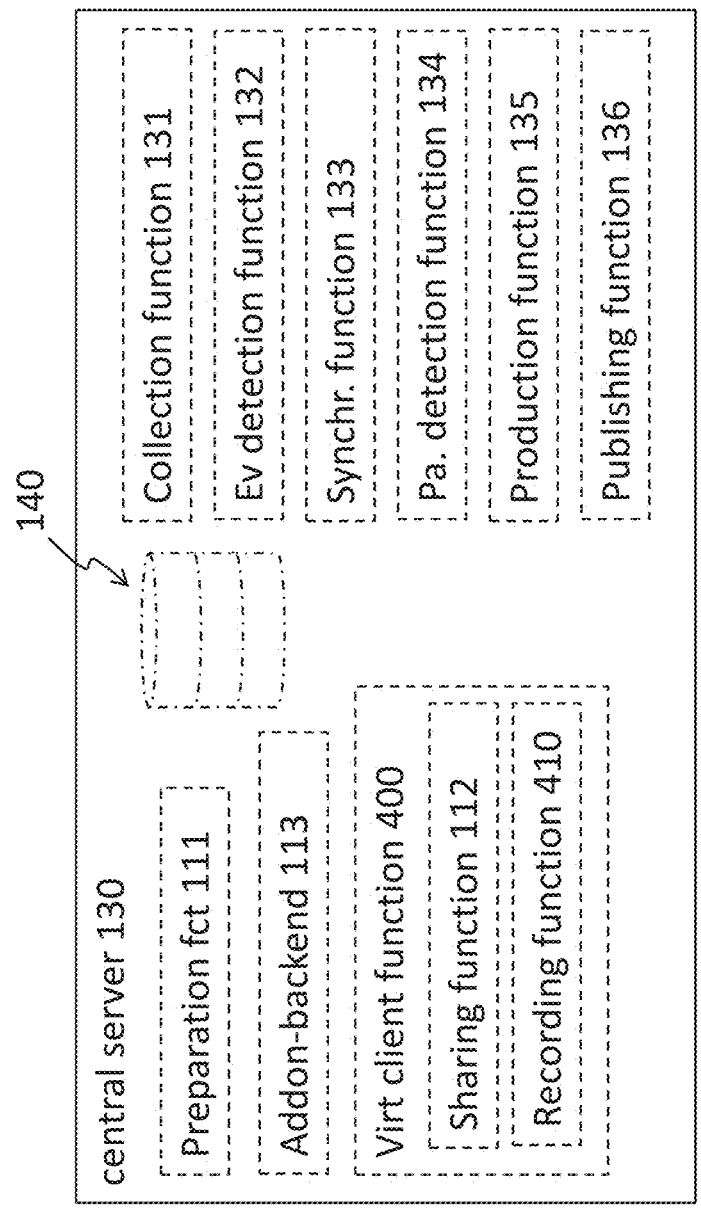

FIG. 3b shows a further example of the central server 130 which may be part of the system 100 according to any one of FIG. 1 to FIG. 3b. The central server 130 of FIG. 3b provides features and functions that may be combined with one or more of the aspects herein.

The central server 130 may comprise a collecting function 131 arranged to receive video and/or audio streams from e.g. the virtual client 140, the client devices 121, the sharing function 112, and possibly also from other sources, such as the storage function, for processing as described below, and then to provide a produced, and sometimes shared, video stream. For instance, this produced video stream may be consumed by an external consumer, such as the destination function 150, or the like, and/or by the video communication service 110 to be distributed by the video communication service 110 to one, more or all of the participant client devices 121.

The central server 130 may further comprise an event detection function 132, arranged to receive video and/or audio stream data, such as binary stream data, e.g. from the collecting function 131, and to perform a respective event detection on each individual one of the received data streams. The event detection function 132 may comprise an AI (Artificial Intelligence) component 132a for performing said event detection. The event detection may take place without first time-synchronising the individual collected streams. The event detection function 132 may detect events. The events may relate to a single video stream. For example, image processing may detect a specific feature in the video stream, such as a cat, a change of page/slide etc. Moreover, audio processing may detect a particular feature, such as a word, a sound, or the like. Examples of words may be "start", "stop", "dog", etc. and examples of sounds may be a hurray, an applause, or the like.

The central server 130 further comprises a synchronising function 133, arranged to time-synchronise the data streams, such as the video and/or audio streams, subtitle stream(s) and the like, provided by the collecting function 131 and that may have been processed by the event detection function 132. The synchronising function 133 may comprise an AI component for performing said time-synchronisation. The synchronising function 133 may, also or alternatively, perform the synchronization as explained e.g. with reference to FIG. 5 and/or FIG. 7.

The central server 130 may further comprise a pattern detection function 134, arranged to detect a pattern based on the combination of at least one, but in many cases at least two, such as at least three or even at least four, such as all, of the received data streams. The pattern detection may be further based on one, or in some cases at least two or more, events detected for each individual one of said data streams by the event detection function 132. Such detected events taking into consideration by said pattern detection function 134 may be distributed across time with respect to each individual collected stream. The pattern detection function 134 may comprise an AI component 134a for performing said pattern detection. The pattern detection may further be based on the above-discussed grouping, and in particular be arranged to detect a particular pattern occurring only with respect to one group; with respect to only some but not all groups; or with respect to all groups. In this context, a pattern detected in one or more of the received video streams may e.g. be that several participants are talking interchangeably or concurrently in the same or different streams; or a presentation slide change occurring concurrently as a different event, such as a different participant talking. This list is not exhaustive, but illustrative. A pattern may comprise, or be defined in terms of, information about one or more of:
  number of simultaneously speaking persons,
  number of persons participating in a conversation,
  which stream among a set of streams has a speaker that is dominating, i.e. sound-wise, any other speakers of the set of streams,
  body language by image/video recognition in one or more streams, where body language includes e.g. nodding head, shaking head for yes/no, hand and/or arm signals, such as waving, thumbs up, time-out sign, etc., and the like.

In some embodiments, a pattern may be defined in terms of a certain extension along the time dimension, for instance by taking into consideration several consecutive video frames or video stream contents over a certain set or minimum amount of time. Hence, a pattern may be defined in terms of several events occurring during a certain time window. For instance, a series of events each defining a slide change in a presentation can together form a pattern if occurring relatively close in time in relation to one another. Such a pattern can then be defined to capture that a user quickly skips through a presentation to a different slide by repeatedly changing to a next or previous slide until a desired slide is reached.

The central server 130 can further comprise a production function 135, arranged to produce a produced digital video stream, such as a shared digital video stream, based on the data streams provided from the collecting function 131, and possibly further based on any detected events and/or patterns. Generally, the production function 135 can produce secondary streams based on input primary streams. Such a produced video stream may at least comprise a video stream produced to comprise one or several of video streams provided by the collecting function 131, raw, reformatted or transformed, and may also comprise corresponding audio stream data. As will be exemplified below, there may be several produced video streams, where one such produced video stream may be produced in the above-discussed way but further based on a another already produced video stream. In some examples, the production function 135 may be comprised in the sharing function 112 and thus the actions performed by the production function may be invoked as part of the actions performed by the sharing function 112.

All produced video streams are preferably produced continuously, and preferably in near real-time (after discounting any latencies and delays of the types discussed hereinbelow).

The central server 130 may further comprise a publishing function 136, arranged to publish the produced digital video stream in question, such as via API 137 as described above.

In a pattern detection step, performed by the pattern detection function 134, the hence time-synchronised shared video streams are analysed to detect at least one pattern selected from a first set of patterns.

In contrast to an event detection step, which can be performed by the event detection function 132, the pattern detection step may preferably be performed based on video and/or audio information contained as a part of at least two of the time-synchronised primary video streams considered jointly.

Said first set of patterns may contain any number of types of patterns, such as several participants talking interchangeably or concurrently; or a presentation slide change occurring concurrently as a different event, such as a different participant talking. This list is not exhaustive, but illustrative.

In alternative embodiments, detected patterns may relate not to information contained in several of said primary video streams but only in one of said primary video streams. In such cases, it is preferred that such pattern is detected based on video and/or audio information contained in that single primary video stream spanning across at least two detected events, for instance two or more consecutive detected presentation slide changes or connection quality changes. As an example, several consecutive slide changes that follow on each other rapidly over time may be detected as one single slide change pattern, as opposed to one individual slide change pattern for each detected slide change event. In some examples, the shared video stream and/or the second video stream may act as primary video streams e.g. to one or more of the collecting function, the event detection function, the synchronization function, the pattern detection function, the production functions and the like.

It is realised that the first set of events and said first set of patterns may comprise events/patterns being of predetermined types, defined using respective sets of parameters and parameter intervals. As will be explained below, the events/patterns in said sets may also, or additionally, be defined and detected using various AI tools.

In a subsequent production step, performed by the production function 135, the shared digital video stream is produced as an output digital video stream based on consecutively considered frames of the time-synchronised primary digital video streams and said detected patterns.

Figure 4:
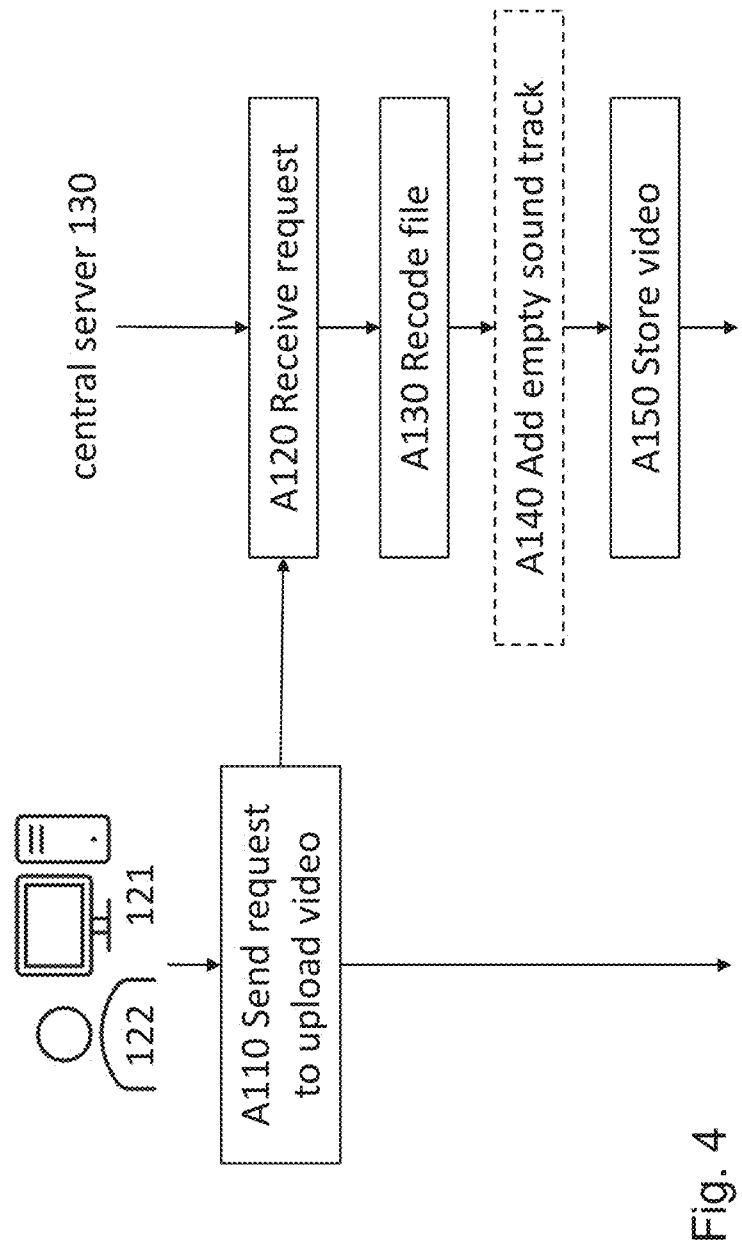
FIG. 4 to FIG. 6 are combined signalling and flowcharts illustrating exemplifying methods herein.

Before proceeding with the description of how the system 100 manages sharing of a video, FIG. 4 illustrates how a video is prepared by the system 100 to allow it to be shared. This example relates to the first and second aspect of the present disclosure.

During preparation of the video, the following actions may be performed in any suitable order. The actions are described as being performed by the central server 130, but the actions may be performed by any one or more of the functions comprised in the central server 130 as described herein. As an example, one or more of the steps may also or alternatively be performed by the preparation function 111 and/or the addon-backend 113.

Action A110

The user 122 selects, using the user's device, a video stored in a file. The user 122 may later join the collaboration session and share the video, but this is not necessary, since the system 100 may allow other users than the user 122 to access and share the video in a subsequent collaboration session. Hence, the video, when stored in the storage function 140, may also be made accessible to another user, different from the user 122, such that said other user may share the video in the collaboration session. The file may be stored at any desired location, such as a local drive, remote drive, a cloud storage or the like. Following the user's 122 selection of the video, the client device 121 sends, to the central server 130, a request to upload the video, e.g. as selected by the user.

Action A120

Subsequent to action A110, the central server 130 receives the video file in order to process it in action A130. This means that the preparation function 111 and/or the addon-backend 113 may receive the request and e.g. a reference to the file to be uploaded according to some examples.

Action A130 The central server 130 may recode, such as transform, or the like, the video to a fixed framerate, if the video file isn't provided with a fixed frame rate. The frame rate may be predetermined or selected by the user. The central server 130 may also transform the video into a desired resolution and/or into a desired frame rate.

Action A140

The central server 130 may add an empty audio track to the video, if the video file lacks audio, such as an audio stream or the like. In this manner, the video may be easier to handle if handling of the video in subsequent steps assumes the video to have an audio track. This action may typically not be required.

Action A150

The central server 130 may store the video. As an example, the central server 130 may ensure that the video is stored by requesting the storage function 140, accessible by the central server 130, to store the file. The central server 130 may or may not comprise the storage function 140. In this manner, the video file may for example be stored in a cloud storage or the like, which is reliable e.g. in terms of accessibility, connectivity, bandwidth, latency and/or the like.

Figure 5:
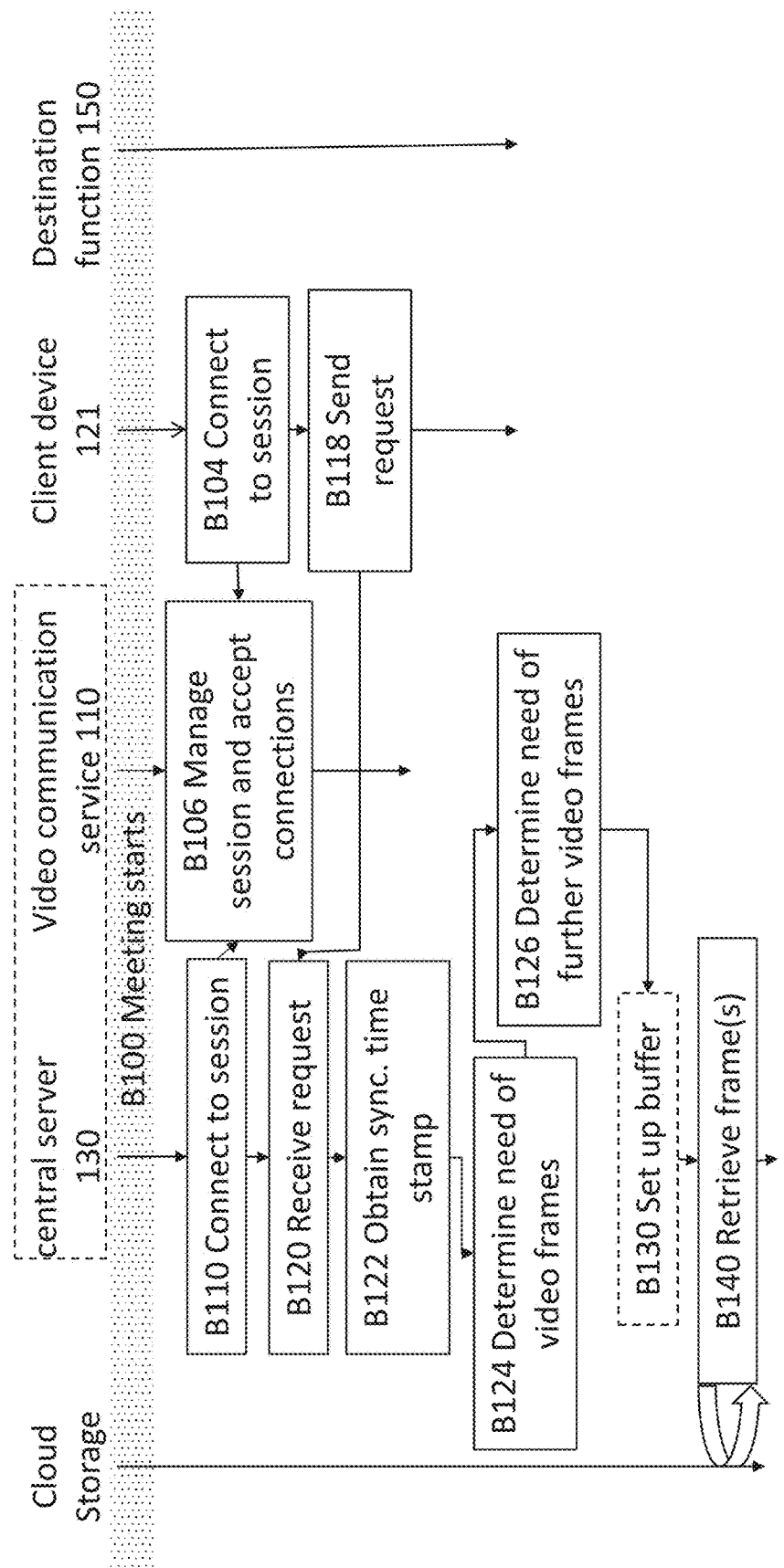
Figure 6:
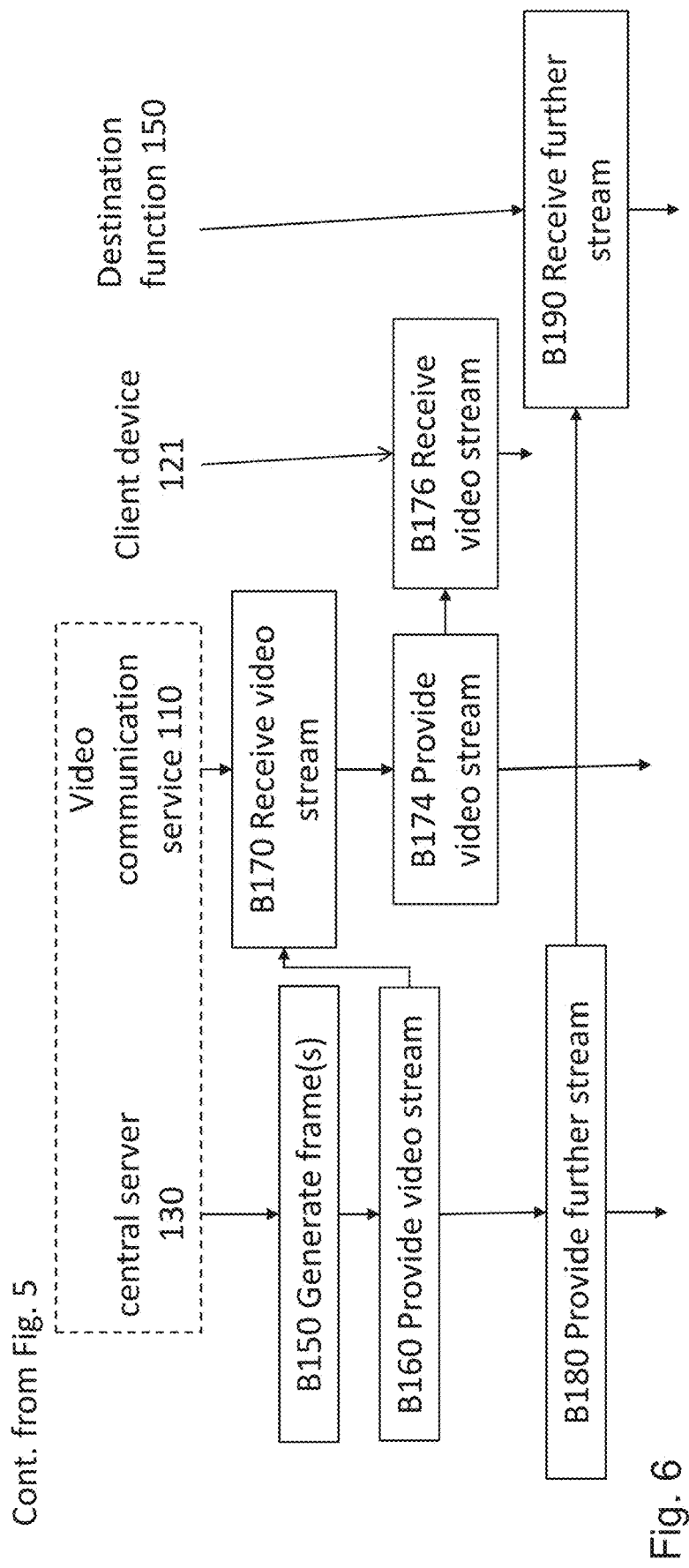

Now turning to FIG. 5 and FIG. 6, that illustrate exemplifying methods according to embodiments herein when implemented in one of the exemplifying systems 100 of FIG. 1 to FIG. 3b. The system 100 thus performs a method for managing sharing of a video in a collaboration session, in which at least two client devices 121,122 are participating. As mentioned, the system 100 may comprise one or more of a video communication service 110 capable of hosting the collaboration session, the central server 130 and the two client devices 121. A video file, representing the video and being stored in the storage function 140, is accessible by the central server 130. The video file may have been stored in the storage function 140 as described above with reference to FIG. 4. The video is to be shared as a shared video stream with a desired resolution and a desired frame rate. The desired frame rate can be a fixed frame rate, but it can also be a variable frame rate. This description is intended to pave the way for a description of further details relating to the first and/or second aspects herein, and optionally also to the third aspect herein, at least to some extent.

In FIG. 5 and/or FIG. 6, the central server 130 is shown as separated from the video communication service 110. However, the central server 130 may comprise the video communication service 110. This means that the actions performed by the video communication service 110 may be performed by the central server 130.

Initially, e.g. before action B110 below, a collaboration session is started B100 and hosted, such as managed or the like, by the video communication service 110. The start of the collaboration session may be triggered by a scheduled command or upon request by any one of the two client devices 121. One of the client devices 121 may be referred to as the first client device 121 and the other one may be referred to as the second client device 122. It may here be noted that the participating client devices 121 of the collaboration session may be organized, such as by the user 122, automatically, based on some criteria like domain of user name, or the like, into one or more groups, which may be associated with different time zones (with meaning as discussed below), different production functions, and/or the like. This will be elaborated upon further below.

As an example, when a user 122 shares the video, it may be shared to one or more various destinations, such as the video communication service 110, the destination function 150, a production function or the like. This means that, in some embodiments, the video is provided to at least two different destinations, or destination functions. As an example, one of the destination functions is the video communication service 110 and the other one of the destination functions is the destination function 150. Hence, for the sake of distinguishing between features related to sharing with the video communication service 110 and features related to sharing with the destination function, the notion "first" and "second" will be used, where "first" is associated with the video communication service 110 and "second" is associated with the destination function 150 unless otherwise is evident from the context. As will be apparent from the following description, in an exemplifying scenario the first stream is related to a first time-zone (with meaning as discussed below) of a collaboration session and the second stream is related to a second, different time-zone of the same collaboration session. For example, the following terms will be used in the following "first destination frame counter", "second destination frame counter", "first desired video frame rate", "second desired video frame rate", "first shared video stream", "second video stream", "first desired resolution", "second desired resolution", "first duration", "second duration", "first time stamp", "second time stamp", and the like. Similarly, when applicable "a/the shared video stream" refers to the "first shared video stream" and "a/the further video stream" refers to the "second video stream" etcetera for the examples above, and other features. In this context, it may be noted that e.g. the first desired resolution may be different from the second desired resolution, etc. as appropriate.

Action B104

Said at least two client devices 121 connect to the collaboration session, e.g. by connecting to the video communication service 110. In this manner, said at least two client devices 121 join the collaboration session. For purposes of sharing the video, the addon 127 may typically be loaded by the client functions 125 executing in a respective one of said at least two client devices 121.

Action B106

The video communication service 110 manages the collaboration session and appropriately accepts connections from said at least two client devices 121 according to known manners.

Action B110

In this action, in some examples when the collaboration session is not hosted by the central server 130, the central server 130 may connect to the collaboration session. Thus, the central server 130 joins the collaboration session. The central server 130, e.g. the virtual client function 400, will thus act as, and appear as, any other client, or client devices, from the perspective of the video communication service 110, which in these examples hosts the collaboration session. This action may be performed after action B120 below, at least in some examples, as described e.g. in FIG. 7.

Action B118

A user, such as the user 122, may select a video to be shared from a number of videos displayed in the client device 121. The videos to display have been prepared by the preparation function 111 and have been uploaded, e.g. by the preparation function 111, to the storage function 140. Sometimes, the video to be shared may be predetermined and the user does thus not need to select the video at all. As another example, the selection of the video to be shared may be triggered by that the user utters a keyword, which has been associated with a certain video. This means for instance that when the user says "cinnamon roll", a video with instruction on how to bake cinnamon rolls will be shared, if this has been prepared in advance. In a further example, the selection of the video may be triggered by that a point in time is reached, or passed, e.g. an absolute time, relatively a start of the collaboration session, or the like. Further, the selection of the video may be triggered by an external command, e.g. received via an API of e.g. the central server 130. Therefore, the request may also be referred to as a trigger command. Also, the selection of the video may be triggered in some other automatic manner, such as by an automatically performing algorithm used to produce the collaboration session.

The user may also select whether or not the video should loop, e.g. be repeated any number of times or until stopped by the user.

The user may also set the volume of audio in the video.

The user may also set a desired video resolution of the video to be shared via the video communication service 110. Optionally, the user may also set a frame rate of the video to be shared via the video communication service 110.

Additionally, the user may set a further desired video resolution of the video to be shared via a destination function 150, such as a software function capable of directing the video, herein referred to as a virtual director. Optionally, the user may also set a further frame rate of the video to be shared towards the destination function 150.

The frame rate and/or resolution may also be automatically determined by the system 100, such as based on a standard or currently used frame rate and/or resolution used in the collaborative session.

Accordingly, typically in response to input provided by the user 122, the client device 121 sends a request for sharing of the selected video to the central server 130. However, the request may in some examples be sent to the central server 130 autonomously by the client device 121, i.e. without requiring user input. For example, the request may be sent by the client device 121 as part of a loading and/or start sequence when joining the collaboration session.

Action B120

Subsequently to action B118, the central server 130 receives the request, or the trigger command, sent in action B118. The request may instruct, such as command, or the like, the central server 130 to share the video in the collaboration session.

Unless the central server 130 hosts the collaboration session as in FIG. 1, the central server 130 may connect to the video communication service 110, such as in FIG. 2 and/or FIG. 3b. Thus, joining the collaboration session. As an example, the central server 130 may start an instance of a sharing function 112, such as an automatic participant client and instruct the sharing function 112 to connect and join the collaboration session. The sharing function 112 may sometimes be referred to as an automatic participant client, a bot, a virtual machine, or the like. The sharing function 112 may typically be associated with an IP address in order to be able to send and receive messages over the Internet.

In some examples, the central server 130 provides information about the video file to the sharing function 112. The information may be a complete file path to a local or remote directory. In this manner, the sharing function 112 is able to find and read the video file.

In a more detailed example, the addon 127 of the client device 121 sends the request to the addon-backend 113. Then, the addon-backend 113 starts up, initiates or triggers the sharing function 112 with information about which file to share. Then, the sharing function 112 connects to the video communication service 110 and joins the collaboration session.

Action B122

The central server 130 obtains a synchronization (sync.) time stamp of an audio frame, relating to the collaboration session, to be used for synchronizing the shared video stream with the collaboration session. In more detail, the synchronization time stamp may be taken from an audio stream provided by the video communication service. The audio stream is the sound of the collaboration session that at least some users of the participating client devices may listen to. As explained herein, there may in some examples be participating client devices in different so called time zones, e.g. with different delays and/or differently produced streams. A purpose of the synchronization time stamp is to provide a reference that can be used when setting time stamps of frames of the shared video stream. Time stamps may for example be set in relation to the reference by measuring time lapsed from when the synchronization time stamp was obtained. The time lapsed will vary due to that duration of the retrieval of the first video frame will vary, e.g. depending on network load, bandwidth, or the like. As an alternative, it is possible to set the time stamps in relation to the reference by adding a predetermined offset, whose value shall be sufficiently large in order to cater for the variation in duration for the retrieval of the first video frame.

In some examples, this action may be performed by the sharing function 112, the synchronization function, or the like. This action may be performed later, such as after retrieval of one video frame in action B140.

Action B124

The central server 130 determines, based on at least a video frame rate difference, whether more, less or same number of video frames, e.g. per time unit, as in the video file are needed in the shared video stream. This means that the central server 130 determines whether more, less or same number of video frames are needed as compared to a number video frames in the video file, again e.g. per time unit. The video frame rate difference is calculated as a difference or discrepancy between the desired frame rate and a source frame rate of the video file. This determination will later be used when video frames are retrieved, such as after action B140 below, to know when to keep, discard or duplicate video frames. In some examples, this action may be performed by the sharing function 112. For variable frame rates, this determination can be performed several times, such as repeatedly or upon a frame rate change in the video file and/or in the shared video stream.

Action B126

In a further determination step, the central server 130 may determine, based on at least a further video frame rate difference, whether more, less or same number of video frames, e.g. per time unit, as in the video file are needed in a video stream. This means that the central server 130 further determines whether more, less or same number of video frames are needed as compared to a number video frames in the video file, again e.g. per time unit. The further video frame rate difference is calculated as a difference between the further desired frame rate and a source frame rate of the video file. This determination will later be used when video frames are retrieved, such as after action B140 below, to know when to keep, discard or duplicate video frames. In some examples, this action may be performed by the sharing function 112. Again, for variable frame rates, this determination can be performed several times, such as repeatedly or upon a frame rate change in the video file and/or in the shared video stream.

Action B130

According to the first aspect, the central server 130 sets up a buffer for provision of the shared video stream to the collaboration session. The buffer is capable of buffering at the most a limited number of video frames that corresponds to a time interval of less than one second, preferably less than 0.4 seconds, more preferably less than 0.2 seconds, or most preferably 0.1 seconds. The limited number of video frames may be determined, e.g. by the central server 130, based on the desired frame rate. For example, the limited number of video frames may be determined as the product of the desired frame rate and the time interval, or correspondingly. This action may be performed by the sharing function 112. This action is optional.

Action B140

The central server 130 iteratively retrieves video frames, such as individual video frames, of the video file. The iterative retrieval may include reception and decoding of the video frames. In some examples, the central server 130 thus iteratively retrieves video frame by video frame, i.e. individual frames in a frame-by-frame manner. Processing of a video frame, as in e.g. action B150 etc., may consequently start as soon as one complete video frame has been retrieved. In embodiments, the entire video file is not retrieved at once, but is instead broken up into several consecutive retrievals of one or more video frames per such retrieval. In some examples, the iteratively retrieved video frame may be taken from a buffer held by the central server 130. In this manner, the central server 130 may reduce the risk of running out of video frames to retrieve, e.g. in case of poor bandwidth, bad connection to the storage function, or the like. Said buffer may be referred to as "source buffer" in order to distinguish from another buffer mentioned herein. Said other buffer may be referred to as "destination buffer" for the same reason.

In an alternative embodiment, the central server 130 may iteratively retrieve video frames from a produced video stream, e.g. produced from a plurality of video sources, which for example includes the video file and one or more other files and/or video streams.

In some examples, this action may be performed by the sharing function 112. For each iteratively retrieved video frame in action B140, the central server 130 preferably performs at least B150. According to various examples herein, the central server 130 also performs action B160 and action B170 for at least some of said iteratively retrieved video frames.

Action B150

The central server 130 generates, based on said each iteratively retrieved video frame, zero, one or more video frames according to the determination step B124, while setting a respective time stamp of said one or more generated video frames based on the synchronization time stamp. Said one or more generated frames have the desired resolution and the respective time stamp corresponds to the desired frame rate.

As an example, the resolution of a video frame may be adjusted using available software and/or known algorithms, e.g. using a codec, or the like.

When the central server 130 generates zero video frames, i.e. no video frame(s), it may mean that said retrieved video frame is discarded, such as skipped, deleted, discarded, or the like, due to that less video frames, e.g. per time unit, are needed in the shared video stream.

When the central server 130 generates one video frame, e.g. having the desired resolution, it may mean that said retrieved video frame is going to be included in the shared video stream. This may happen when more or same number of video frames, e.g. per time unit, are needed in the shared video stream as compared to in the video stream stored in the video file. Of course, this may also happen when a video frame has been skipped in a preceding iteration of the retrieval of video frames.

When the central server 130 generates more than one video frame, i.e. an additional video frame, it may mean that the generated video frame has been duplicated, such as copied, referenced, or the like, in order to fill in with additional video frames due to that more video frames are needed in the shared video stream.

In some examples, this action may be performed by the sharing function 112.

Action B160

The central server 130 provides the shared video stream by sending the one or more generated video frames, e.g. to the video communication service 110.

As an example, the central server 130 may insert said one or more generated video frames into a buffer for provision to the client device(s) 121. In some examples, the frames in the buffer are sent via the video communication service 110 to the client device(s) 121. In other examples, the central server 130 may send the respective video frame directly, e.g. without any buffering, i.e. without the use of the buffer.

This action may be performed by the sharing function 112.

Action B170

Next, the video communication service 110 receives the shared video stream, e.g. frame-by-frame or upon release of the buffer, if used.

Depending on the actual video communication service 110, it may be possible that the central server 130 labels the shared video stream in various ways. The label will be interpreted by the video communication service 110, which for example feeds the shared video stream to the client devices 121 for display in different manners, such as in screen share mode, camera mode, or the like.

Action B174

While the video frames are received in action B170, the video communication service appropriately handles the frames and provides the video stream to the client devices 121, which are participating in the collaboration session.

Action B176

Subsequently to action B174, the client devices 121 receives the video stream, including video frames and optionally audio frames. In more detail, the client function 125 of the client device 121 receives the video stream and displays the video to the user 122.

The frames and/or audio of the video stream comprising the frames in question can be time-synchronized with other primary and/or secondary streams occurring in the system 100, so that each of the frames in the video stream appears or is used simultaneously as corresponding frames of other such occurring streams. For instance, in case the video stream comprising the frames processed as described in connection to steps B110-B174 is used as a primary stream, it can be time-synchronized with one or several additional primary streams used to produce a secondary stream in turn fed to one or several participants 121 and/or the destination function 150. The time-synchronization can be based on the timestamp described above, that in turn can be extracted from an audio track.

Action B180

The central server 130 may provide a further video stream by sending further one or more video frames to the destination function 150. In some examples, the further video stream may be a second shared video stream, e.g. when the destination function 150 is a participant in the collaboration session. As an example, the sharing function 112 may perform this action, e.g. to enable the video communication service 110 to provide the further video stream. As mentioned above, in some embodiments, there may thus be two different shared video streams, which may be referred to as the first shared video stream, e.g. as in action B160 and the like, and the second video stream, or the second shared video stream, e.g. as in this action B180.

Again, it may here be noted that e.g. actions B122, B124, B140, B150, B160 and action B180, and possibly further actions, may be performed by the sharing function 112.

As an example, the first shared video stream and the second video stream can relate to the same video, e.g. the same video file, mentioned in e.g. action B120. However, one or more of the resolution, the frame rate, or the like, may be different for the two aforementioned video streams. Furthermore, the two video streams may have been processed, or will be processed by, the same or different productions functions as described herein.

In some examples, the destination function 150 may be a particular client device 121, e.g. associated with a particular time zone and/or a particular deliberate delay. The expressions "time zone" and "deliberate delay" are explained below.

In some examples, the central server 130 may provide the further video stream by inserting said further one or more video frames into a further buffer, e.g. related to the particular client device 121. In all these examples, said time-synchronization can be used so that individual frames that correspond to each other occur or are used simultaneously.

Action B190

Subsequent to action B180, the destination function 150 receives the further video stream, e.g. frame-by-frame optionally via the buffer.

With reference to one or more of FIGS. 4-6, the central server 130 may, in some examples, process the video, e.g. from the storage function 140, from the client device 121, from the virtual client, or the like. The processing may for example comprise performing voice recognition and subsequent translation into a different language that is provides as text and/or audio for the video, translation into text, in the same or different language, that is provided as subtitles to the video, etc.

Figure 7:
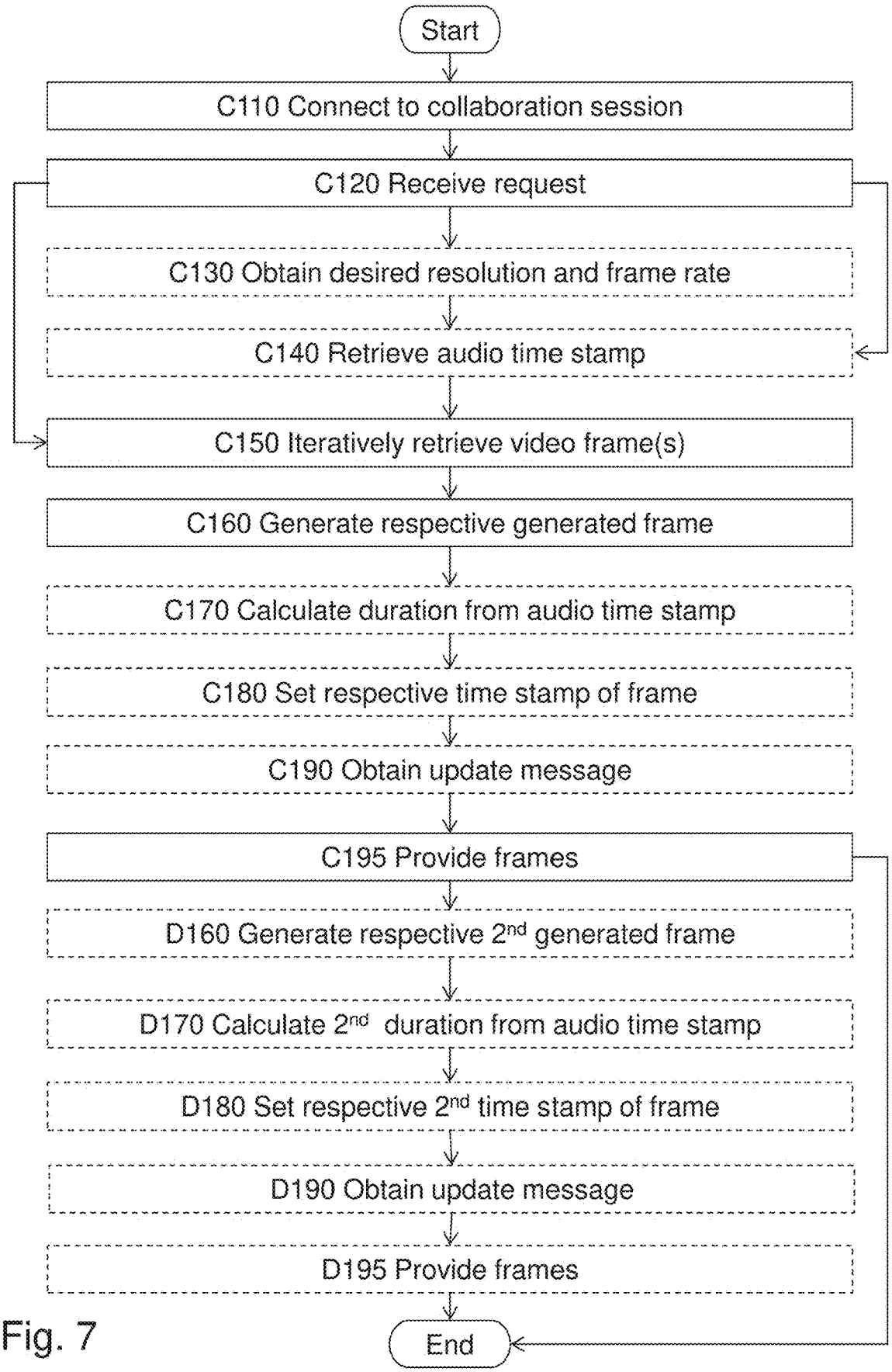
FIG. 7 is an exemplifying flowchart illustrating exemplifying methods herein.

In FIG. 7, a schematic flowchart of exemplifying methods in the central server 130 is shown. Accordingly, the central server 130 performs a method for enabling sharing of a video, via the video communication service 110, with said at least two client devices 121. As an example, the sharing function 112, or the like, may perform the actions of FIG. 7. This example applies to the first and/or second aspects herein, and to some extent the third aspect herein.

Action C110

The central server 130 connects to the collaboration session. When the central server 130 comprises the video communication service 110, this action may be omitted, or performed internally within the central server 130.

In some examples, the addon 127 may send a start message to the addon-backend 113, which in turn will initiate, e.g. start or the like, the sharing function 112. The start message may be sent by the addon 127, in response to that the addon 127 has loaded, in response to user input, or the like. The user input may be that the user 122 has selected a file and chosen to share it, or that the user 122 separately has clicked a button to prepare for sharing of a file.

The addon-backend function 113 may, in some examples, provide information about the video file to the sharing function 112. Then, the sharing function 112 will be able to find and retrieve video frames from the video file.

This action is similar to action B110.

Action C120

The central server 130 receives a request from one of said two client devices 121. This action is similar to action B120.

Action C130

The central server 130 may obtain the desired resolution and the desired frame rate. Again, the desired frame rate can be a fixed or variable frame rate. As an example, the desired resolution and the desired frame rate may be predetermined, e.g. read from a memory, or the like. A predetermined desired resolution and/or a predetermined frame rate may be given by the video communication service 110 or the central server 130, e.g. as per requirement for the service. This action is thus optional. In other examples, the desired resolution and the desired frame rate may be input, e.g. using a keyboard, a mouse, a touch screen, or the like, by the user 122.

Furthermore, the central server 130 may obtain an indication of a size of the buffer, e.g. in terms of number of frames. In some examples, the central server 130 may obtain a length in terms of time to be used for the buffer. The indication of the size of the buffer may then be determined by the central sever 130 based on the length in terms of time and the desired frame rate. For example, the size of the buffer may be the length in terms of time, e.g. in seconds, multiplied by the desired frame rate, e.g. in frames per second. The length of the buffer in terms of time may be less than 2 s, preferably less than 1 s, more preferably less than 0.5 s and most preferably less than 0.2 s. These values translate to corresponding sizes in terms of frames while depending on the desired frame rate.

Action C140

The central server 130 may retrieve an audio time stamp of an audio stream associated with the collaboration session. The audio stream is received by the central server 130 from the video communication service 110, such as via an API of the video communication service 110 or the like. This action may be included in action B122.

The central server 130 may also initiate a measurement of time to be used in action C170 or the like. For example, the central server 130 may also start a timer in order to keep track of time from when the audio time stamp was received. In some examples, the central server 130 may read a current number of ticks, e.g. from the operating system of the central server 130 or the like. In this manner, the central server 130 may keep track of time from when the audio time stamp was received. Thanks to that the central server 130 uses the audio time stamp for synchronization, the synchronization may be achieved without a dedicated synchronization signal from the video communication service. Such a dedicated synchronization signal may be a message, a signal in the received audio stream, a signal in the received video stream or the like.

Before retrieval of video frames, e.g. as in action C150 below, the central server 130 may obtain, such as read, fetch, receive, or the like, information about streams from the video file. The information about streams may comprise an indication about number of streams in the file, an indication about types of streams, or the like. The types of streams may comprise video, audio, subtitles or the like.

As an example, when the central server 130 finds that there are multiple video streams, the central server 130 can select the video stream with the highest resolution among the video streams in the file.

As a further example, when the central server 130 finds that there are multiple audio streams, the central server 130 can typically select the audio stream with the highest resolution among the audio streams in the file. However, in some examples, the central server 130 may also select any one of any further audio streams if available. In some examples, the central server 130 may select an audio stream with a resolution that corresponds to, such as is closest to, or almost closest to, the desired resolution. These examples are applicable to at least some embodiments herein.

In embodiments including the sharing function 112, the sharing function 112 may receive a message with information about a source video frame rate of the video to be shared and possibly also a source resolution of the video to be shared. The message may be generated by the central server 130 by use of information, such as video frame rate and resolution of the selected stream, from the selected stream.

At this stage, the central server 130 may also determine a video frame rate difference between the desired frame rate and the source frame rate of the video file. In this manner, the central server 130 may establish whether more, less or same number of video frames, e.g. per time unit, are needed in the shared video stream as elaborated upon in the following.

Moreover, in some examples when a second video stream shall be provided, the central server 130 may also determine a further video frame rate difference between a further desired frame rate and the source frame rate of the video file. In this manner, the central server 130 may establish whether more, less or same number of video frames, e.g. per time unit, are needed in the further video stream, aka the second video stream, similarly as for the shared video stream, aka the first video stream.

Accordingly, with some embodiments herein, the central server 130 may determine, based on the video frame rate difference, whether the shared video steam, i.e. the first/second video stream as applicable, shall have more, less or same number of video frames, e.g. per time unit. This mean, e.g., a lower, higher or same frame rate as compared to in the video stream of the selected file. See also action B124 and/or B126. Notably, the central server 130 may consider the video frame rate difference to be insignificant, when the video frame rate difference is less than 0.5 frames per second (fps), preferably less than 0.1 fps, and most preferably less than 0.01 fps. Here, the absolute value of the video frame rate difference is considered, i.e. no consideration of whether more or less frames are needed is taken when assessing the insignificance of the video frame rate difference. For variable frame rate embodiments, a corresponding fixed frame rate can be calculated or estimated and used instead of the variable frame rate.

Action C150

The central server 130 iteratively retrieves, such as receives and/or decodes, or the like, video frames. In this context, it may be noted that, in some examples, the retrieved video frames may be provided by a production function that generates a produced video stream based on the video file and one or more other video/audio sources. This action is similar to action B140.

Action C160

The central server 130 generates, based on said each iteratively retrieved video frame, zero, one or more video frames according to the determination step B124, while setting a respective time stamp of said one or more generated video frames based on the synchronization time stamp. Said one or more generated frames have the desired resolution and the respective time stamp corresponds to the desired frame rate. The time stamp may be set according to various manners as described in e.g. action C170 and the like. This action is similar to action B150.

Action C170

The central server 130 may calculate a duration indicating time lapsed from when the audio time stamp was retrieved. As an example, the aforementioned timer may be used, such as read, read off or the like, to obtain said duration. Further, as exemplified above, the central server 130 may again read a further current number of ticks from the operating system and thus obtain a measure of the duration. However, in some examples, action C170 may, instead of calculating the duration, retrieve an audio time stamp similarly to action C140. The purpose is in both cases to establish a time reference that is common to the collaboration session and the shared video stream, such as the first and/or second video stream. This action may typically be performed only once, preferably after a firstly retrieved video frame.

Action C180

The central server 130 may set the respective time stamp of said one or more generated video frames based on the synchronization time stamp, such as the time stamp obtained from the audio of the collaboration session.

As an example, the central server 130 may set the respective time stamp TS of said one or more generated video frames based on the duration D, a destination frame counter dFC for counting frames provided to the collaboration session, and the video frame rate difference. The destination frame counter may be used for counting of video frames to be included in the shared video stream.

This action may be a part of action B150.

As an example the respective time stamp TS may bet set according to:

$$TS = \text{timestampOfAudio} + D + \text{desiredTDelta} * dFC$$

where desiredTDelta is given by the desired video frame rate, e.g. by re-calculating the video frame rate to a corresponding time interval between video frames. In some cases, the desired video frame rate is equal to, or substantially equal to, the source video frame rate. Then, as mentioned above, the video frame rate difference is considered to be insignificant. The duration D may, in some examples, be zero. This may for example be the case when the synchronization time stamp, timestampofAudio is retrieved after the first frame has been retrieved, but before action C180, preferably closely before, more preferably directly before. This may thus be the case action C180 is performed for the firstly retrieved video frame.

In order to achieve a desired frame rate in the shared video stream, the central server 130 may evaluate the sign of the frame rate difference, i.e. whether it is positive or negative, and the magnitude of the frame rate difference.

As mentioned before, when the magnitude of the frame rate difference is below a threshold value, the frame rate difference can be considered to be insignificant and no frames will then be added or removed when preparing the shared video stream. Consequently, the frame rate difference can be considered to be significant when the threshold is exceeded, or reached as the case may be.

When the frame rate difference is calculated as the desired video frame rate reduced by the source frame rate, a negative sign on the frame rate difference may indicate that the shared video stream shall have less frames. This happens when the desired frame rate is less than, i.e. significantly less than, the source frame rate. Of course, if the frame rate difference is calculated as the source frame rate reduced by the desired frame rate, the sign will be positive when less frames are needed in the shared video stream. Similar considerations apply for when more frames are needed in the shared video stream.

As an example for when the video frame rate difference is significant and less video frames are needed in the shared video stream, the central server 130 generates zero or one video frames, i.e. said each video frame, based on the destination frame counter for keeping track of video frames for the video communication service, the source video frame rate, the desired video frame rate and a source frame counter SFC for keeping track of the amount of retrieved video frames. The source frame counter may thus be a sequence number for said each video frame, which may be seen as a current video frame being proceeded. In more detail, e.g. the central server 130 may calculate a source time delta STD as the inverse of the source video frame rate, and a desired time delta DTD as the inverse of the desired video frame rate. Hence, the central server 130 generates one or more video frames, e.g. per each said video frame, when the source time delta STD multiplied by the source frame counter is greater than or equal to the desired time delta DTD multiplied by the destination frame counter. Otherwise, the currently processed video frame is discarded as required in order to reduce the frame rate. In addition, when one or more video frames are generated, the central server 130 increments, such as increases by one, the destination frame counter, otherwise the central server 130 maintains the current value of the destination frame counter, i.e. the destination frame counter is not incremented nor decremented.

As an example for when the video frame rate difference is significant and more video frames are needed in the shared video stream, the central server 130 can generate one or more generated frames, i.e. said each video frame, based on—as above—the destination frame counter for keeping track of video frames for the video communication service, the source video frame rate, the desired video frame rate and the source frame counter SFC for keeping track of the amount of retrieved video frames.

In more detail, e.g. the central server 130 may calculate—as above—the source time delta STD and the desired time delta DTD. Hence, the central server 130 can generate said each video frame when the source time delta STD multiplied by the source frame counter is greater than the desired time delta DTD multiplied by the destination frame counter. In addition, the central server 130 may duplicate the video frame and provide it to the video communication service 110 when needed. It may here be noted that the central server 130 may continue to duplicate the video frame so long as the source time delta STD multiplied by the source frame counter is greater than the desired time delta DTD multiplied by the destination frame counter. The central server 130 may also increment the destination frame counter for each duplicated video frame. Moreover, the time stamp of the duplicated frame(s) can be offset from the respective time stamp of the frame that was duplicated by a multiple of the desired time delta DTD, i.e. for the first duplicated frame by 1*DTD, for any existing second duplicated frame by 2*DTD, for any existing third duplicated frame by 3*DTD etc.

In some examples, the central server 130 may maintain a current video frame counter in order to keep track of the respective generated video frames order and count.

Action C190

The central server 130 may obtain, such as receive, read, or the like, an update message instructing the central server 130 to set the desired video frame rate and the desired resolution according to information comprised in the message, whereby an updated desired video frame rate and/or an update desired resolution is obtained. The update message may be received from the client device 121, e.g. in response to user input, or the like. In this manner, the resolution and/or the frame rate of the shared video stream may be adjusted on the fly, e.g. when sharing of the video already is in progress. A changed frame rate in a variable frame rate regime may be handled in a corresponding manner.

Action C195

The central server 130 provides the shared video stream by sending the one or more generated frames, e.g. for distribution in the collaboration session by the video communication service 110. This action is similar to action B160.

The central server 130 may, also or alternatively, send the first and/or second video stream to the storage function 140 for saving. This may be beneficial when the resolution and/or frame rate have been adjusted in said first and/or second video stream. This makes it possible to, e.g. as part of action C140 or similar for any one or more of the aspects herein, to select a stream, e.g. such a previously saved stream, that matches the desired resolution and/or the desired frame rate, since the file may then comprise a previously produced or shared video stream. In this example, the central server 130 may also save metadata, e.g. relating to events, for the video.

Furthermore, the central server 130 may send the first and/or second video stream to the production function(s).

Furthermore, also with reference to FIG. 7, the central server 130 may provide a further video stream, aka a second video stream. The second video stream may have a second desired frame rate and a second desired resolution, which e.g. may be predetermined and/or obtained in the same or similar manner as described for the first desired frame rate and the first desired resolution. The second video stream is different from the first shared video stream, at least with respect to one characteristic, such as frame rate, resolution, or the like. In some cases one of the video streams is a fixed frame rate stream whereas the other one is a variable frame rate stream. In some examples, the second video stream is a second shared video stream, since it may be distributed to at least one of the client devices 121 that participates in the collaboration session. The central server 130 may have obtained, such as input by the user input, as a predetermined value, or the like, a second desired resolution and/or a second desired frame rate associated with the second video stream to be provided. Cf with action B118 above.

Action D160

As an example, the central server 130 may generate, based on said each iteratively retrieved video frame, zero, one or more further video frames according to the further determination step B126, optionally while setting a respective time stamp of said one or more further video frames based on the synchronization time stamp. Said one or more further video frames have the further desired resolution and the respective time stamp corresponds to the further desired frame rate. The time stamp may be set according to various manners as described in e.g. action C170 and the like. This action is similar to action B150 and C160.

Action D170

The central server 130 may calculate a further duration, aka a second duration, indicating time lapsed from when the audio time stamp was retrieved. As an example, the aforementioned timer may be read to obtain said second duration. Further, as exemplified above, the central server 130 may again read a further current number of ticks from the operating system and thus obtain a measure of the second duration.

In some examples, the same duration as in action C170 may be used also for the second video stream, in particular when the first and second video streams are processed in parallel. However, when the second video stream is intended to be provided to one or more participants of a time zone, it may be preferred that the further duration is calculated, and optionally also different from the duration calculated in action C170.

This action is similar to action C170.

Action D180

The central server 130 may set a further respective time stamp of the respective generated video frame, aka a second respective time stamp, based on the second duration, a second destination frame counter for counting frames provided to the destination function, and the second frame rate difference. This action is similar to action C180.

Action D190

The central server 130 may obtain an update message including a further desired frame rate and/or a further desired resolution. This action is similar to action C190.

Action D195

The central server 130 may provide the second video stream by sending the selected respective generated frames. This action is similar to action B160 and C195.

Actions D160, D170, D180, D190 and D195 may be performed independently of their corresponding actions related to sharing of the first shared video stream, i.e. before, after or simultaneously with one or more of these corresponding actions.

It may here be noted that the first and second aspects herein may be combined to form some further embodiments. This means for example that, as applicable, the sharing function may perform some of the actions described for the first aspect, e.g. described as being performed by the central server. This means for example that some embodiments of the second aspect may include buffering as explained for the first aspect.

Figure 8:
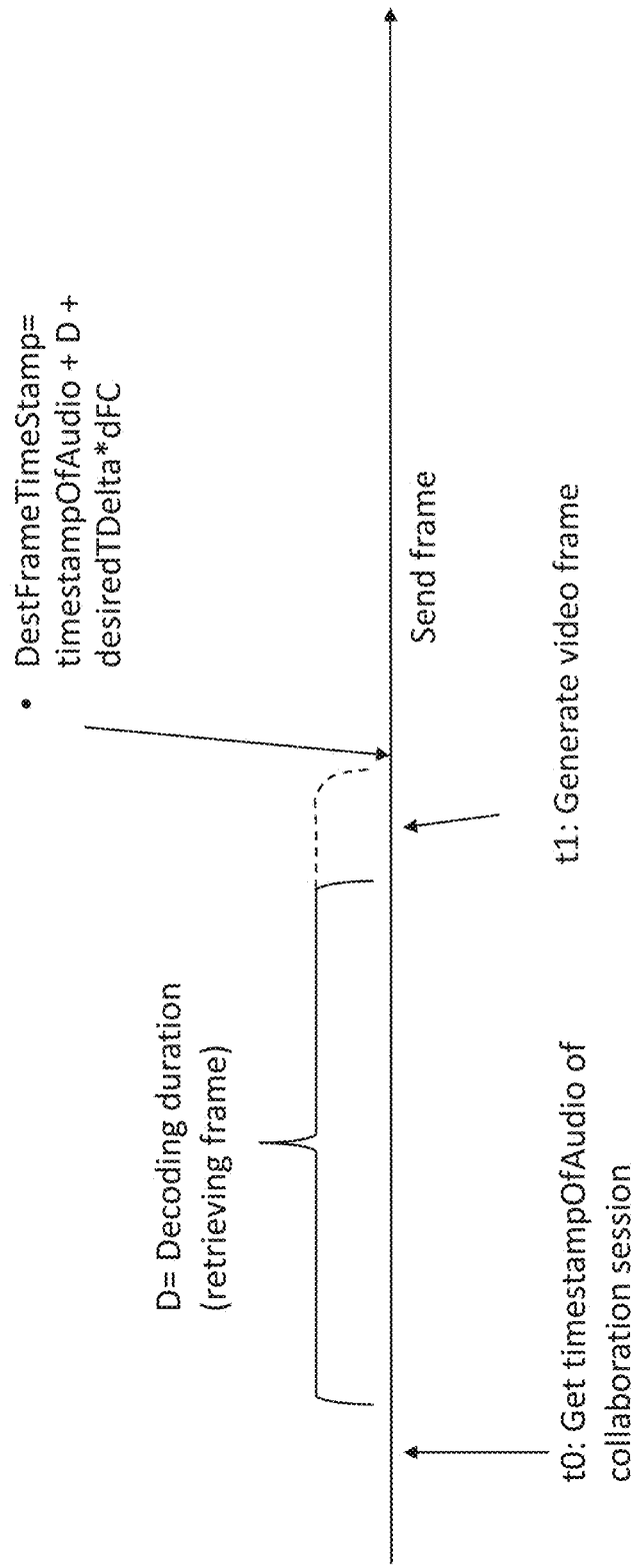
FIG. 8 is a timeline illustrating establishing of time stamps for video frames.

FIG. 8 shows an exemplifying timeline in which the central server 130, such as the sharing function 112, or the like, may receive the request and retrieve an audio time stamp of a current audio frame of an audio stream at time t0. This example may be applied to, at least partly, the first, second and/or third aspect of the present disclosure. The audio stream is associated with the collaboration session. This means for example that audio stream belongs to, or origins from, the collaboration session. The audio stream can be a main or only audio stream shared by several or all video streams occurring or used in the collaboration session. For instance, the audio stream can be produced by the video communication service 110 based on two or more of available audio streams in the collaboration session. The audio time stamp can thus be retrieved after the central server 130 has connected, or has been connected, to the collaboration session.

At time t1, the central server 130 has retrieved, such as decoded or the like, a video frame in a frame-by-frame manner of the video. As described above, the central server 130 performs different handling based on whether more or less frames are needed in the shared video stream, such as the first and second video stream. In some examples, any required change of the resolution of the video frame may also have been performed before time t1, but this is optional.

As an alternative or an addition, the central server 130 may retrieve the audio time stamp of the current audio frame at time t1, i.e. after retrieval of the video frame. The synchronization is thus performed after any delay caused by the retrieval, and decoding, of the video frame from the video file.

Next, the video frame is provided, such as sent, inserted into a buffer for sending of video frames, or the like, to the destination, such the video communication service for distribution in the collaboration session, the destination function, or the like.

Advantageously, at least some embodiments herein may thus provide an improved video sharing experience without requiring any modification(s) to software of the client function 125 and/or the video communication service 110. As an example, the addon 127, the addon-backend 113 and the sharing function 112 according to the second aspect herein may provide the aforementioned improved sharing experience.

Figure 9:
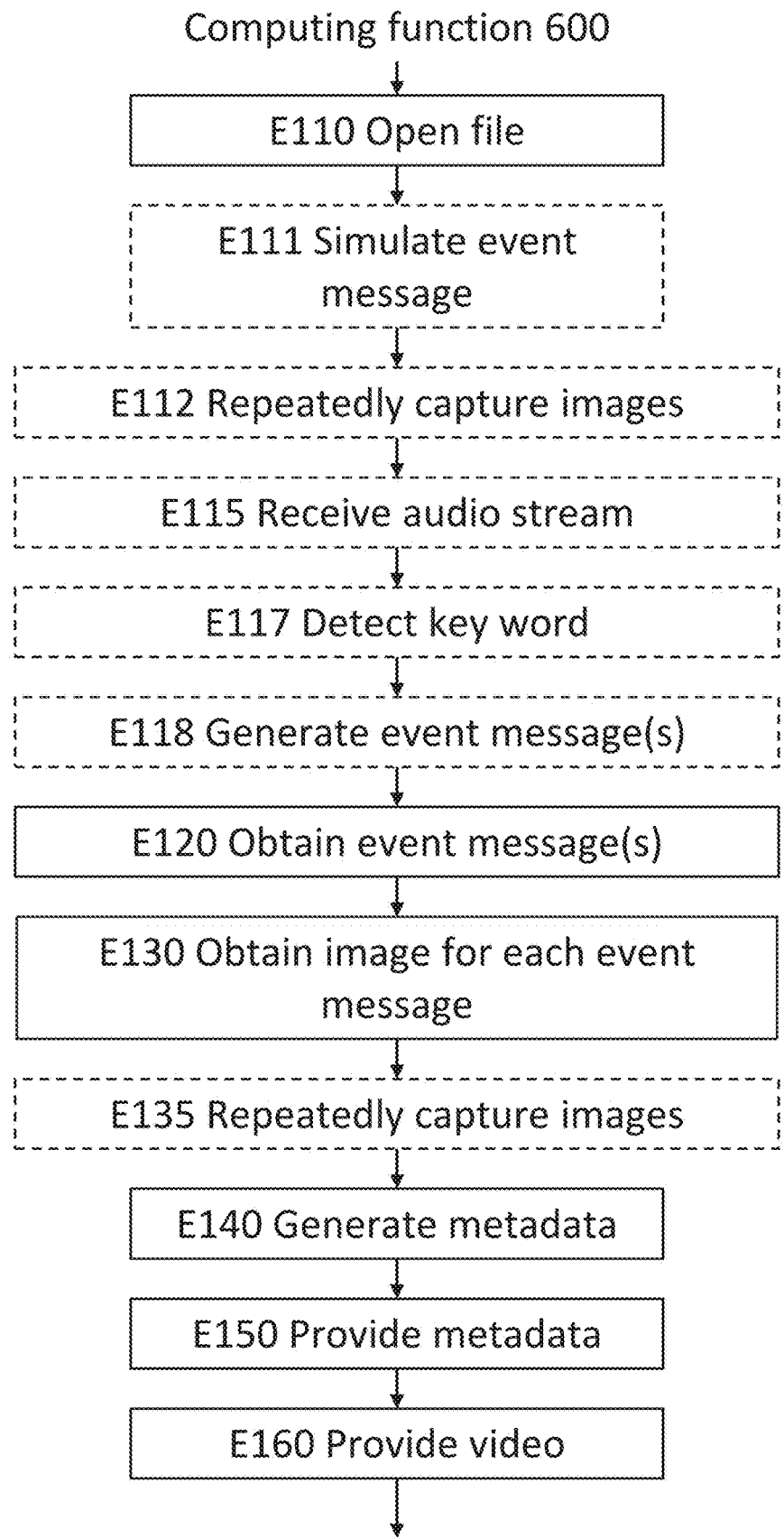
FIG. 9 is a flowchart illustrating exemplifying methods herein.

According to the third aspect of the present disclosure, an exemplifying flowchart is illustrated in FIG. 9. In this example, an exemplifying computer-implemented method for managing a file may be performed by a computing function 600. According to a first example, the computing function 600 may be a recording addon executing on the client device 121.

Action E110

The computing function 600 opens the file by means of a rendering function 610, which renders at least a portion of the file as an image. The rendering function 610 may be a browser program capable of opening the file and displaying its content as intended.

Sometimes a script, such as a JavaScript, a TypeScript or the like, may support the browser when rendering the file. In some examples, the rendering function 610 may be realized as a server-side rendering function.

According to the first example, this action may be performed by the recording addon. E.g., the recording addon may open the file, which may be stored locally or remotely. Typically, at least a portion of the file is visible to the user 122 when the file is open.

Notably, in some examples, the file may be opened using a logical display device, which may mean that the contents of the file may not be visible, e.g. on the client device 121 or elsewhere. Yet, it is still possible to obtain images of content of the file as rendered by the rendering function 610. As an example, the rendering function 610 may capture a so called screen dump of the display device, which thus may be an actual display device or a virtual/logical display device. In other examples, a rendered image is not displayed anywhere but merely stored after rendering has been finalized of the image in question. The rendered image can have any suitable format, such as a bitmap; a vector-graphics file; or an encoded file, such as encoded using HTML.

Action E111

The computing function 600 may read or simulate said one or more event messages by generating input events that change the image rendered by the rendering function 610. As described below, input events may be right/left mouse click, scroll, page up/down, any other keystroke, or the like.

Action E112

The computing function 600 may repeatedly capture images rendered by the rendering function 610. In this manner, the computing function 600 may monitor the rendered image over time for changes, or differences.

Action E115

The computing function 600 may receive an audio stream of the collaboration session from the video communication service 110.

Action E117

Subsequent to action E115, the computing function 600 may detect a key word in the audio stream, as described below.

Action E118

The computing function 600 may, when a difference is detected between two consecutively captured images, generate an event message of said one or more event messages. The event message indicates that the two consecutively captured images are different from each other.

Alternatively, the computing function 600 may, when a difference is not detected between two consecutively captured images, generate an event message of said one or more event messages. The event message indicates that the two consecutively captured images are similar, such as equal, identical, or almost identical, to each other.

A detected difference may be a difference being larger than a defined threshold difference, calculated based on any suitable measure such as an average pixel value difference or a transformation-based difference (for instance, an image being offset sufficiently far in a screen pixel coordinate system). A detected difference may furthermore be based on a smallest time having elapsed since a latest captured difference, so that images can be captured only with a certain minimum allowed cadence or less frequently.

Action E120

The computing function 600 obtains one or more event messages.

Said one or more event message may relate to the image rendered by the rendering function 610. In more detail, said one or more event messages may relate to events that changed the image rendered by the rendering function 610.

The event message may comprise information about one or more of:

Left and/or right mouse click, and optionally a position at which the click occurred, Window scroll, Window zoom, Typing, keystrokes, and optionally an identification of the key associated with the typing, number of current page, slice, or the like, title of current sheet, etc., events received from the hosted application, such as, slide changed, page changed, current page, current sheet, language changed, presentation started/ended, etc.

timestamp, and the like.

Said one or more event messages, or events, may be caused by that the user interacts with the rendered portion of the file. Additionally or alternatively, the events may be caused by that the addon simulates that a user interacts with the rendered portion of the file.

According to the first example, this action may be performed by the recording addon. E.g., the recording addon may listen to the events, e.g. from the rendering function, or the like.

In some embodiments, said one or more event messages may be generated by that e.g. the recording addon obtains, such as receives, or the like, and detects one or more keywords, e.g. in an audio stream received from the video communication service 110 as in the first example, in the portion of the file which is currently represented in the image rendered by the rendering function, or the like.

The keyword(s) may be predetermined.

However, the keyword(s) may, also or instead, be any or all words detected in the audio stream in a certain duration in which there was no change to the image provided by the rendering function.

Yet further, again in combination with the above or solely, the keyword(s) may be extracted from the image using optical character recognition and/or the keyword(s) may be extracted from the portion of the file which the image represents, e.g. by use of the rendering function.

The keyword(s) may then be included, or referenced, in the metadata and thus also associated with the image, e.g. of that certain duration, point in time, or the like in the video being created in action E160.

In some embodiments, said one or more event messages may be generated by the computing function 600 monitoring, e.g. regularly, irregularly, frequently, continuously, or the like, the image rendered by the rendering function for changes.

The method comprises, for each event message of said one or more event messages: action E130 and E140.

Action E130

The computing function 600 obtains an image for each event message. As an example, the image may be associated with one or more event messages. In some examples, there is a respective image for each event message, but this is not required. The image, or the respective image, has been, or is, rendered by the rendering function 610. This means that the image, or the respective image, represents a rendered portion of the file, such as a currently rendered portion, a latest rendered portion, or the like. The image, or the respective image, is associated with a sequence indication, such as counter, a time stamp, a ticket indicating a position in a sequence of images, or the like. In more detail, each respective image, or the image, may preferably be associated with a respective sequence indication. The respective sequence indications may preferably be different from each other. The respective sequence indications may be used to uniquely identify a defined order, and possibly a timeline, for the captured images.

Action E135

In some examples, said one or more event messages comprises an indication to start a sequence of repeatedly capturing images by means of the rendering function 610 or an indication to stop the repeatedly capturing of images by means of the rendering function 610.

The computing function 600 may, when obtaining, such as receiving or the like, the indication to start, repeatedly capture images by means of the rendering function 610.

Action E140

The computing function 600 generates metadata based on the event message and the sequence indication. The sequence indication may comprise or be one or several of a time stamp, a counter, or the like, and/or a value derived therefrom.

In examples where action E135 is performed, the computing function 600 may generate a plurality of event messages until the indication to stop is obtained, or received.

The computing function 600 may associate information derived from the event message to the sequence indication to generate the metadata.

For example, the metadata may comprise:
the sequence indication, or a value based on the sequence indication,
an event identifier, generated based on the event message, such as "click", "double-click", "zoom", "page down/up", "scroll" or the like,
event data, also generated based on the event message, such as position of "click", page number, slide number, zooming percentage, number of scrolled lines, or the like.

In some examples, the metadata defines a manner in which the file was handled in order to result in the rendered image. For instance, after being opened the metadata can, for each captured image, comprise information about one or several user commands (such as page down or mouse click) resulting, when applied to the opened document by the software function used to render the document, results in the rendered image. In some embodiments, the definition provided by the metadata is complete in the sense that it is possible to deterministically arrive at one, several or all of the rendered images by opening the document using a defined software function and then apply any instructions, commands or input specified in the metadata.

In examples, where the value derived from the sequence indication is used, it may be that the value is a time stamp indicating the point in time that the image was captured, the value is extrapolated therefrom, or the like.

Action E150

The computing function 600 provides, such as sends, saves, or the like, the metadata. The metadata may be sent to local and/or remote storage, and/or saved to local and/or remote storage. The metadata may be stored together with, as a part of or associated with the captured images, for instance as a part of a resulting video.

Action E160

The computing function 600 provides a video comprising a set of images. The set of images comprises the respective image for each event message. The video is a representation of the file. As an example, the video may be a video file, a video stream, or the like.

According to some examples, each image of the set of images of the video may be provided with, such as associated with, assigned to, or the like, the sequence indication. Typically, said each image, or video frame, has a respective time stamp.

When using the metadata, the following steps may be performed, e.g. by the computing function or the like.

A search term is obtained. The search term may identify a particular event identifier and/or some particular event data. When the search term is found in the metadata, the particular sequence indication associated with the search term is used to get a reference into a particular point in time of the video. It is then possible to jump, skip, fast-forward, or the like, to the point in time of the video given by the reference.

In other embodiments, the metadata can be used to interpret a difference between a first rendered image and a preceding or proceeding rendered image, by interpreting an instruction, command or input resulting in the change between the rendered images. For instance, the detection of a "page down" instruction can be interpreted as the subsequent image being a "next page" of the rendered document, and this information can be used to skip to that subsequent rendered image in order to skip to the next page of the rendered document.

Figure 10:
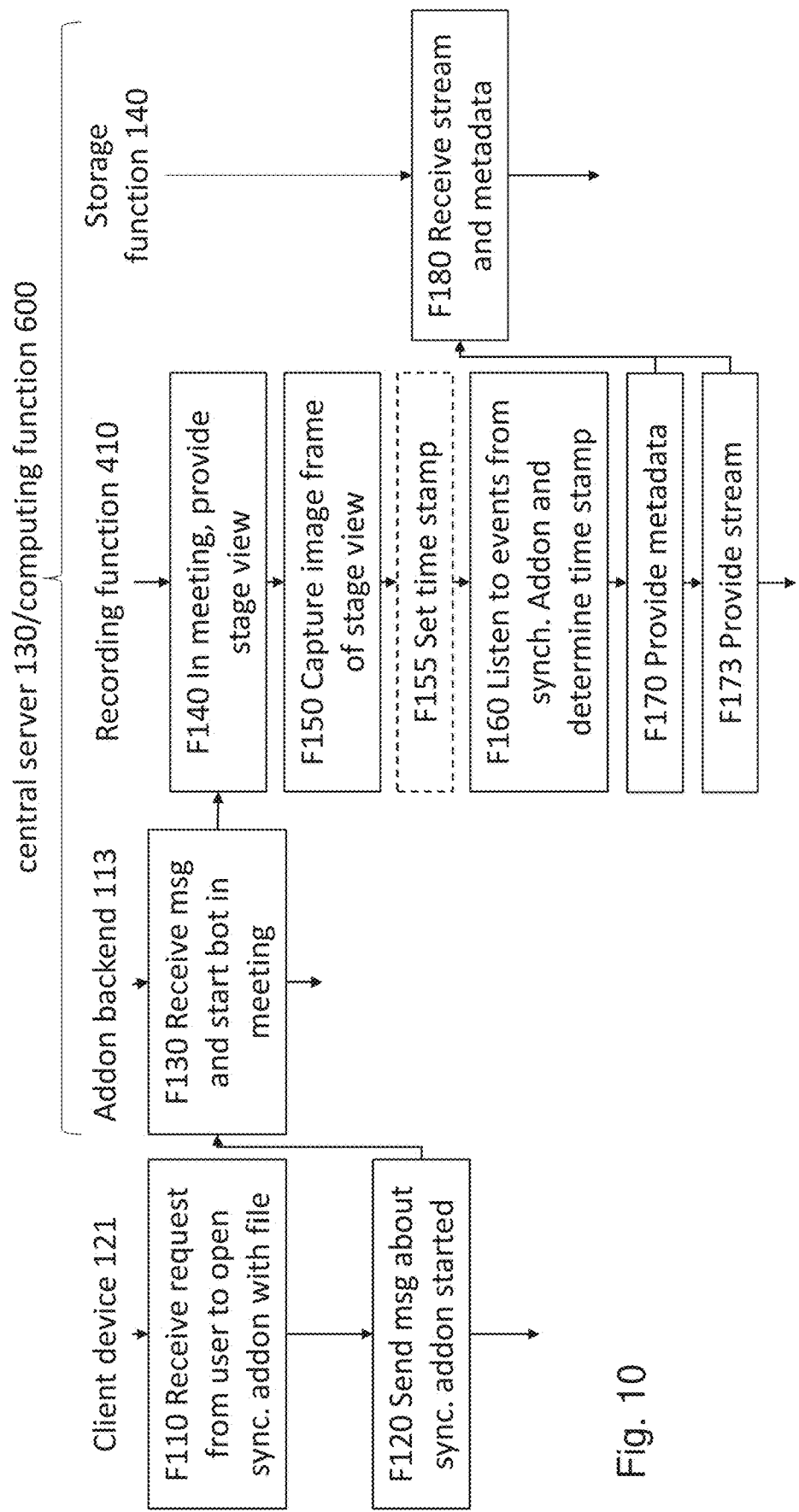
FIG. 10 is a combined signalling and flowcharts illustrating exemplifying methods herein.
Figure 11:
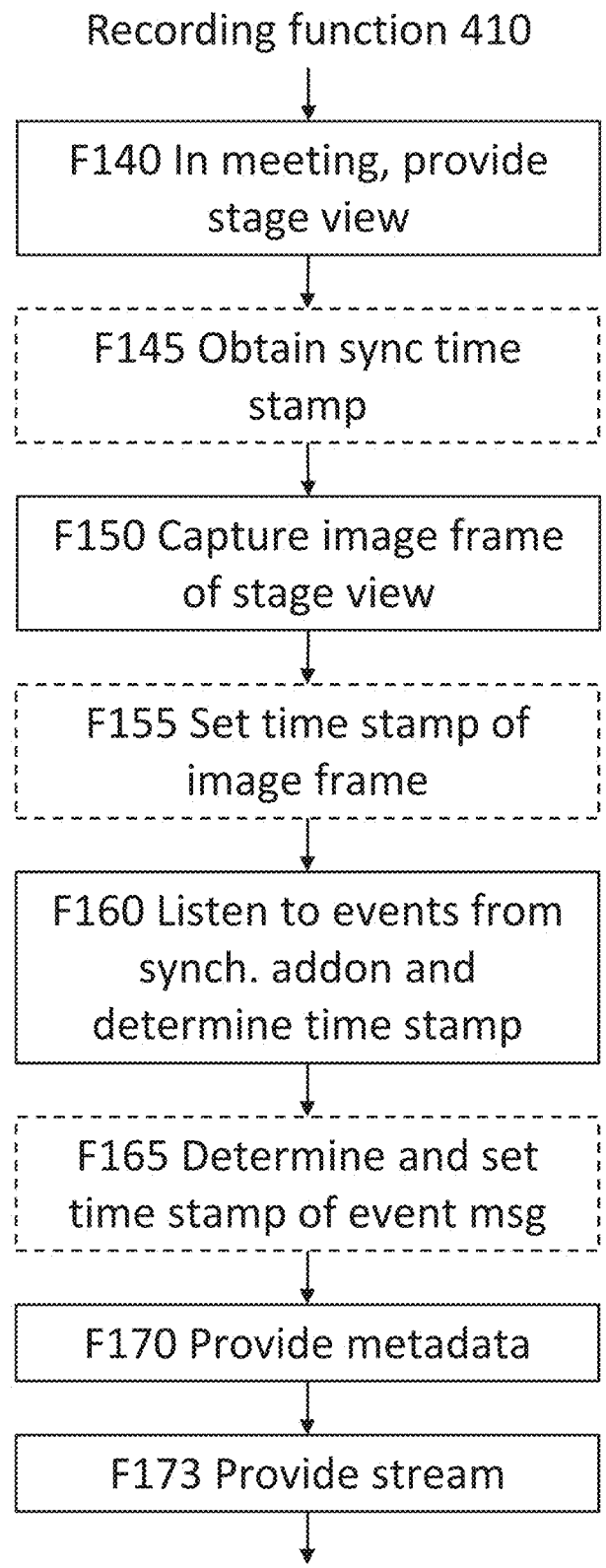
FIG. 11 is a flowchart illustrating exemplifying methods herein.

Moreover, an exemplifying method according to the third aspect of the present disclosure is illustrated in FIG. 10 and FIG. 11. FIG. 10 and FIG. 11 are examples of the methods illustrated in FIG. 9. In this example, the system 100, such as any one of the system of FIG. 1, 2, 3a or 3b, may perform the exemplifying method, which comprises management of content of a file shared in a collaboration session, in which at least one client device 121 is participating. The system 100 comprises a video communication service 110 capable of hosting the collaboration session, a central server 130 and the client device 121. See also FIG. 3b for the actions performed by the recording function 410, e.g. comprised in the central server 130. In this example, the event messages may originate from any participant in the collaboration session, such as a client device and/or a virtual client that have/has joined the collaboration session. The event messages may, in some examples, be generated by the client device 121, the central server 110, the recording function, the synchronization addon, or the like.

Action F110

Initially, e.g. the user 122 may request, via the client device 121, to share content of a file using a synchronization addon 128 executing on the client device 121. The synchronization addon may enable all participants to collaborate by synchronizing the data that is collaborated on among all the participants. As an example, this kind of synchronization may be handled by a known synchronization framework, such as SignalR, LiveShare, or the like, depending on environment. Here, environment may refer to the video communication service and the associated client software for which a Software Development Kit (SDK) may be available, but if no SDK is available the functionality described here, and otherwise in this disclosure, may be directly incorporated in the video communication service and the associated client software. A purpose of the known synchronization framework is to facilitate development of programs like the synchronization addon 128. In this manner, the software developer does not need to e.g. develop a synchronization backend and complicated synchronization routines for keeping data at different locations in synchrony. All of this, and possibly more, is provided by the synchronization framework.

Expressed differently, the client device 121, e.g. an addon executing in the client device 121, may receive a request to start the synchronization addon 128 with the file, which may have been selected by the user 122.

In some examples, the client device 121 obtains a request for sharing of the content of the file in the collaboration session using a synchronization addon 128 which creates a respective instance of the synchronization addon 128 executing in each client 121 of said at least one client device 121 that participates in the collaboration session, wherein the central server 130 maintains a central copy of the file in synchrony with a respective data portion managed by the respective instance of the synchronization addon 128 of said each client 121, wherein the respective data portion corresponds to at least a portion of the central copy of the file.

Action F120

The client device 121 sends a message to the central server 130, wherein the message instructs the central server 130 to capture image frames of the content displayed by an instance of the synchronization addon 128, which executes in a recording function 410, In some examples, the client device 121 sends a message to an addon-backend 113 of the central server 130. In more detail, the message may be sent by the addon 127 to its associated addon-backend 113. The message may include information about that the synchronization addon has been included in the collaboration session. As such, a respective instance of the synchronization addon is executing in all participants of the collaboration session. Notably, the functionality and appearance of the synchronization addon 128 may sometimes be different for different participating client devices. In some examples, the synchronization addon 128 may hence programmatically detect a type of the client and act accordingly. A type of the client may refer to "participant", "meeting organizer", "presenter", "viewer", "editor", a role of the client as described herein, or the like.

Action F130

Subsequently, the addon-backend 113 may typically receive the message from the client device 121, such as the addon 127, or the like. Then, the addon-backend 113 sends the message to a recording function 410. This may simply mean that the addon-backend 113 forwards the message to the recording function 410. The message may comprise information about the collaboration session, such as an identifier by means of which the recording function may be allowed to join the collaboration session.

The addon-backend 113 may also start the recording function 410, e.g. acting as a virtual client, if the recording function 410 is not already running. As an example, the addon-backend 113 can initiate, send commands to start, or the like, the recording function 410.

Action F140

If not started, the recording function 410 may have been started as above. Then, the recording function 410 receives the message, originating from the client device 121, e.g. the addon 127 executing in the client device 121. As an example, this effectively means that the client device 121, e.g. the addon 127, may send the message to the recording function 410, e.g. via the addon-backend 113.

By use of the information in the message, the recording function 410 may join the collaboration session. As a result thereof, the recording function 410 may run a second synchronization addon 128, i.e. an instance of the synchronization addon 128. The message may thus comprise information identifying the collaboration session, and additional information, like a url, path, host name, or the like. In this manner, the synchronization addon may for example handle different file types based on the path, e.g. using different paths that invoke code to handle the current file type.

In this example, the event message may comprise information about one or more of:

Left and/or right mouse click in an instance of the synchronization addon,

Window scroll in an instance of the synchronization addon,

Typing in an instance of the synchronization addon, number of current page, slice, or the like, title of current sheet, etc.

sound events in the audio of the collaboration session, such as 'applause', "wow", "cheering", "singing", voice recognition for certain words, such as 'note', 'look', 'dog', 'easy', etc., type of background music, such as upbeat, sad, happy, scary, etc., or the like.

Or various suitable events.

The synchronization addon 128 may thus perform various analyses, e.g. on the video and/or audio stream in order to generate the metadata, by extraction from a relevant portion of the content file, etc. The analyses include, but are not limited to, voice recognition, optical character recognition, music analysis, general image processing, or the like. As used herein, the term "event" may refer to any information that may be collected, e.g. after analysis and/or detection, by the recording function.

Action F145 (FIG. 11)

The central server 130 may obtain a synchronization time stamp of the collaboration session. See similar action of obtaining a synchronization time stamp herein.

Action F150

The central server 130 repeatedly captures, by the central server (130), a respective image frame of a portion of the content, e.g. that is currently, represented by the respective instance of the synchronization addon 128 that executes in the central server 130. In some examples, the recording function 410 may repeatedly capture an image of the synchronization addon, since the recording function 410 runs its own instance thereof. In some examples, the recording function 410 may obtain a synchronization time stamp, e.g. only once, for each captured image, or regularly or irregularly, or the like. The synchronization time stamp may be obtained from a time stamp of the audio stream of the collaboration session as described herein. The synchronization time stamp(s) may not always be required, such as when the images, e.g. frames, shall be used independently of the collaboration session, such as saving, or the like.

However, each captured image is often, but not always, associated with a respective time stamp. The respective time stamps can be set based on the desired frame rate. For example, if the desired frame rate is fixed 40 frames per second, a difference between any two consecutive time stamps will be 1/40 seconds.

The time stamps set for each image will be used in action F160 below.

The repeating of the capturing of the images may be performed at any desired time interval, e.g. regularly or irregularly or the like. In some examples, the desired time interval may be set to match a desired frame rate of the stream to be provided in action F173.

Alternatively, action F150 is trigged by an event message, e.g. obtained in action F160 below. This means for example that action F150 may be performed irregularly as trigged by action F160.

Action F155

The central server 130, such as the recording function 410, may set a respective frame time stamp of the respective image frame based on the synchronization time stamp.

Action F160

The central server may repeatedly obtain event messages, wherein each event message comprises information relating to user input and/or the content, e.g. in the respective instance of the synchronization addon (128)

This may for example mean that the recording function 410 listens to the event message(s), e.g. from the synchronization addon 128 executing in the recording function 410.

When the event message is received by the recording function 410, the recording function 410 determines a respective event time stamp to be associated with the event message, i.e. with at least the information comprised in the event message.

The respective event time stamp may be determined by the recording function 410 in various manners as described in the following or other manners.

As an example, the recording function 410 may set the respective time stamp to be equal to the latest time stamp of the latest captured frame.

As another example, the recording function 410 may set the respective time stamp to be equal to a closest time stamp, e.g. in terms of time span, among the time stamp of the latest captured frame or an upcoming time stamp for a to be captured frame.

As a further example, the recording function 410 may set the respective time stamp relatively the latest time stamp of the latest captured frame, e.g. by measuring time lapsed between capturing of the latest frame and the reception of the event message.

Action F165 (FIG. 11)

The central server 130, such as the recording function, may determine a respective event time stamp for each respective event message of the event messages to obtain metadata associated with the content, wherein the determining is based on the synchronization time stamp and a point in time at which said each respective event message was received, wherein the metadata comprises the respective event time stamp and the information of said each respective event message for the event messages.

Action F170

In some examples, the central server 130 and/or the recording function 410, or the like, provides, such as sends, or the like, the metadata for storage in a storage function 140.

Action F173

The central server 130 and/or the recording function 410, or the like, may provide the respective captured images or frames as a video, e.g. a video stream, a video file, or the like. As an example, the respective captured images may be sent as a video stream, e.g. to a destination function, such as a production function, a video communication service, or the like.

In some examples, the recording function 410 sends the video stream and/or the metadata for storage in a storage function 140. The video stream and the metadata may be saved in two different files or in a common file.

In other examples, the recording function 410 sends the video stream to the video communication service 110 for distribution in the collaboration session.

Action F180

The storage function 140 may obtain, such as receive, or the like, the video stream and/or the metadata and store them in a local or remote storage according to known manners.

As a result, the content of the file, such as any file, a document, a presentation, a spreadsheet, or the like, has been converted into a video that is available from the storage function 140. This thus allows the video, representing the content of the file, to be shared as a shared video stream according to the first and/or second aspect of the present disclosure. In some examples of the first and/or second aspect of the present disclosure, the system 100 also retrieves the metadata from the storage function 140. The system 100, e.g. the addon 127 or the like, may for example read at least some of the metadata, preferably all of the metadata, and display user-interface objects to the user 122. Each user-interface object may be associated with a respective piece of metadata, but the addon 127 may not necessarily display the respective piece of metadata itself. The user-interface objects allow the user 122 to jump to a portion of the video which corresponds to a time stamp associated with the respective piece of metadata of the user-interface object selected by the user 122.

Advantageously, with at least some embodiments of the third aspect herein, the metadata may make it possible to find a particular point, or portion, of the video stream. The particular point may easily be found, e.g. by the user, the addon, or the like. In some scenarios, it is contemplated that the addon may, e.g. by use of AI, autonomously determine that the particular point, or portion, of the shared video shall be used, i.e. in a production. Furthermore, this means that the addon, by use of the video file and the associated metadata, may choose which video stream to include in the production in response to the metadata.

In general, the file can be a file with or without having a timeline defined as an integrated part of the file. For instance, the file can be static (such as a plaintext document) or dynamic (such as a hypertext document or an interactive webpage). Using the mechanisms described herein, such a file can be converted into a set of rendered images with associated metadata, such images possibly being ordered along a time line. The set of rendered images can form a video stream, or be converted into a video stream having a desired resolution and/or a desired fixed or variable frame rate using the mechanisms described herein. Such conversion can be performed in connection with the rendering or subsequently, and can be performed as a background process without displaying the rendered images; be performed by a user 122 opening and operating on the opened document on the user's client 121 without the user being part of an ongoing collaboration session; or be performed as a side-effect of the opened file being shared and manipulated during an ongoing collaboration session. Once the file has been converted into a set of rendered images or a video stream, the metadata associated with the individual frames can be used to quickly skip back and forth in the images/video during a collaboration session, where the images/video is treated as a primary video stream of the type discussed herein but configured to represent the file in a set of available states (such as scrolling down a text document; flipping between different slides in a presentation; performing an interactive task on a webpage; or showing different chapters of a video film). A video stream representing a set of rendered image can comprise one respective frame per frame rate-determined time point (one frame per frame), or it can comprise a time stamp per rendered image (variable frame rate). In the former case, rendered images can be duplicated along a time line. In the latter case, there is no need for frame duplication but instead the variable frame rate is used to determine when a next frame is to be displayed in the video stream. A video stream constructed this way can be used as a primary video stream in any of the ways described herein. When the video stream is used by a participant user 122, such as by being shared as initiated using the corresponding client 121, the user 122 can use control commands entered via the client (for instance keyboard or mouse inputs) to control the video stream, so that the video stream skips back and forth in dependence of control commands and using the stored metadata of the video stream to determine to what time in the video stream to skip to depending on the sequence of control commands entered by the user. Such presentations may result in a new video stream being produced (a primary video stream) that can then be used as input to the production of a secondary stream, and so forth. A video stream produced based on a file can be processed as described above to have a predetermined frame rate and/or resolution.

Figure 12:
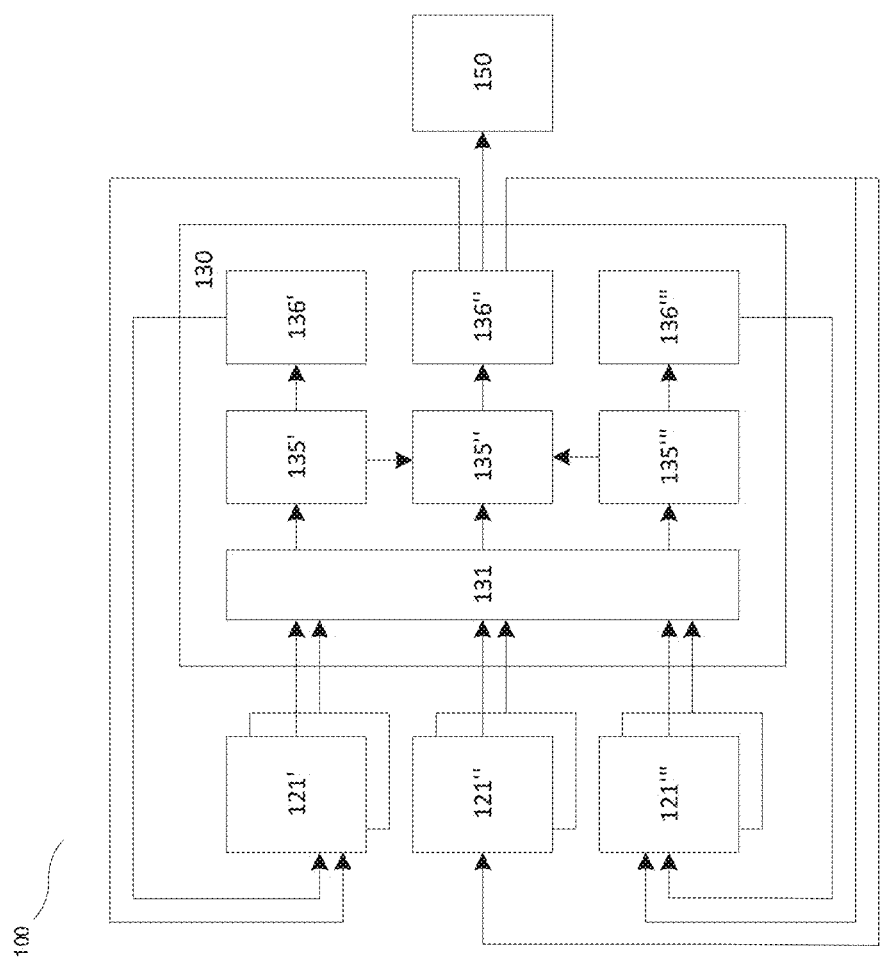
FIG. 12 is a block diagram illustrating an exemplifying system.

As shown in FIG. 12, the participating clients 121 may be organised into two or more groups of participating clients 121. FIG. 12 is a simplified view of the system 100 in a configuration to perform automatic production of an output video stream in cases where there are such groups.

In this FIG. 12, the central server 130 comprises the collecting function 131, that may be as described above.

The central server 130 also comprises a first production function 135', a second production function 135" and a third production function 135'''. Each such production function 135', 135", 135''' corresponds to the production function 135, and what has been said above in relation to production function 135 applies equally to production functions 135', 135" and 135'''. The production functions 135', 135", 135''' may be distinct or co-arranged in one single logical function with several functions, and there may also be more than three production functions, depending on the detailed configuration of the central server 130. The production functions 135', 135", 135''' may in some cases be different functional aspects of one and the same production function 135, as the case may be. The various communications between the production functions 135', 135", 135''' and other entities, such as the sharing function, or the like, may take place via suitable APIs.

It is further realised that there may be a separate collecting function 131 for each of the production functions 135', 135", 135''' or groups of such production functions, and that there may be several logically separated central servers 130, each with a respective collecting function 131, depending on the detailed configuration.

Moreover, the central server 130 comprises a first publishing function 136', a second publishing function 136" and a third publishing function 136'''. Each such publishing function 136', 136", 136''' corresponds to the publishing function 136, and what has been said above in relation to publishing function 136 applies equally to publishing functions 136', 136" and 136'''. The publishing functions 136', 136", 136''' may be distinct or co-arranged in one single logical function with several functions, and there may also be more than three publishing functions, depending on the detailed configuration of the central server 130. The publishing functions 136', 136", 136''' may in some cases be different functional aspects of one and the same publication function 136, as the case may be.

In FIG. 12, three sets or groups of participating clients are shown, for illustrative purposes, each corresponding to the above-described participating client 121. Hence, there is a first group of such participating clients 121'; a second group of such participating clients 121"; and a third group of such participating clients 121'''. Each of these groups may comprise one or, preferably, at least two, participating clients. There may be only two such groups, or more than three such groups, depending on the detailed configuration. The allocation between groups 121', 121", 121''' may be exclusive in the sense that each participant client 121 is allocated to maximum one such group 121', 121", 121'''. In alternative configurations, at least one participant client 121 may be allocated to more than one such group 121', 121", 121''' at the same time.

FIG. 12 also shows a destination function 150, such as an external consumer, or the like, and it is realised that there may be more than one such external consumer 150 as described above.

FIG. 12 does not, for reasons of simplicity, show the video communication service 110, but it is realised that a video communication service of the above-discussed general type may be used with the central server 130, such as providing a shared video communication service to each participating client 121 using the central server 130 in the way discussed above.

Respective primary video streams may be collected, by collecting function 131, from the respective participating clients 121, such as participating clients of said groups 121', 121", 121'''. Based on the provided primary video streams, production functions 135', 135", 135''' may produce respective digital video output streams.

As illustrated in FIG. 12, one or several such produced output streams may be provided as respective input digital video streams from one or several respective production functions 135', 135''' to another production function 135", that may in turn produce a secondary digital output video stream for publication by publication function 136", the secondary digital output video stream thus being produced based on one or several input primary digital video streams as well as on one or several pre-produced digital input digital video streams.

In some embodiments, the synchronisation function 133 performs a step that comprises deliberately introducing a delay (in this context the terms "delay" and "latency" are intended to mean the same thing) of at the most 30 seconds, such as at the most 5 seconds, such as at the most 1 seconds, such as at the most 0.5 seconds, but longer than 0 s, so that the shared video stream is provided at least with said delay. At any rate, the deliberately introduced delay is at least several video frames, such as at least three, or even at least five or even 10, video frames. As used herein, the term "deliberately" means that the delay is introduced irrespective of any need for introducing such a delay based on synchronisation issues or similar. In other words, the deliberately introduced delay is introduced in addition to any delay introduced as a part of the synchronisation of the shared video stream with e.g. the audio stream of the collaboration session. The deliberately introduced delay may be predetermined, fixed or variable in relation to a common time reference, e.g. the synchronization time stamp. The delay may be measured in relation to the synchronization time stamp. Furthermore, the delay may be different for the first and second video streams, which are discussed herein, e.g. in action B160, B180 and throughout the disclosure.

In some embodiments, a relatively small delay is introduced, such as less than 0.6 second, preferably less than 0.4 seconds, more preferably less than 0.2 seconds, or most preferably 0.1 seconds. This delay will barely be noticeable by participants in a collaboration session of a video communication service 110. In other embodiments, such as when the shared video stream will not be used in an interactive context but is instead published in a one-way communication to a destination function 150, a larger delay may be introduced. This may for example apply to the second video stream.

The deliberately introduced delay, aka deliberate delay for short, may be enough so as to achieve sufficient time for the synchronisation function 133 to map the collected individual primary stream video frames onto the correct common time reference time stamp 261. It may also be enough so as to allow sufficient time to perform the event detection described above, in order to detect lost primary streams, slide changes, resolution changes, and so forth. Furthermore, deliberately introducing said delay may be enough so as to allow for an improved pattern detection function 134, as will be described in the following. The deliberate delay may sometimes cater for enough time to execute any desired production function.

It is realized that the introduction of said delay may involve buffering each of the collected and time-synchronised primary video streams before publishing the output video stream using the buffered frames in question. In other words, video and/or audio data of at least one, several or even all of the primary video streams may then be present in the central server 130 in a buffered manner, much like a cache but not (like a conventional cache buffer) used with the intention of being able to handle varying bandwidth situations but for the above reasons, and in particular to be used by the pattern detection function 134.

Hence, in some embodiments said pattern detection step comprises taking into consideration certain information of at least one, such as several, such as at least four, or even all, of the primary digital video streams 210, 301, the certain information being present in a later frame 213 than a frame of a time-synchronised primary digital video stream 210 yet to be used in the production of the output digital video stream 230. Hence, a newly added frame 213 will exist in the buffer 250 in question during a particular latency time before forming part of (or basis for) the output video stream 230. During this time period, the information in the frame 213 in question will constitute information in the "future" in relation to a currently used frame to produce a current frame of the output video stream 230. Once the output video stream 230 timeline reaches the frame in question 213, it will be used for the production of the corresponding frame of the output video stream 230, and may thereafter be discarded.

In other words, the pattern detection function 134 has at its disposal a set of video/audio frames 213 that have still not been used to produce the output video stream 230, and may use this data to detect said patterns.

In summary, using a combination of the event detection based on individual primary video streams; the deliberately introduced delay; the pattern detection based on several time-synchronised primary video streams and any detected events; and the production process based on the detected patterns, makes it possible to achieve automated production of the output digital video stream according to a wide possible selection of tastes and styles. This result is valid across a wide range of possible neural network and/or rule-based analysis techniques used by the event detection function 132, pattern detection function 134 and production function 135. Furthermore, it is valid in with at least some embodiments featuring a first produced video stream being used in the automatic production of a second produced video stream; and use of different deliberately added delays for different groups of participant clients. In particular, it is also valid in at least some embodiments herein, in which a detected trigger results in the switch of what video streams are used in the produced output video stream or results in an automatic crop or zoom of a used video stream in the output video stream.

The two or more different production steps 135', 135", 135'" may comprise the introduction of a respective time-delay, at least two of the time-delays typically differing from each other, but not necessarily. In some embodiments, one or several of the respective produced output digital video streams from these production steps 135', 135", 135'" may be time-unsynchronised, due to said time-delay introduction, with any other of the video streams that may be provided to other participant clients in said publishing step. Such time-delays may be deliberately added and/or be a direct consequence of the production of the produced digital video stream in question, in any of the ways described herein. As a result, any participating client consuming said time-unsynchronised produced output digital video stream will do so in a "time zone" which is slightly offset, e.g. time-wise offset, in relation to a video stream consumption "time zone" of said other participating clients.

For instance, one of the groups 121', 121", 121'" of participating clients 121 may consume a respective produced video stream in a first such "time zone", whereas participating client 121 of another of said groups 121', 121", 121'" may consume a respective produced video stream in a second such "time zone". Since both these respective produced video streams may be produced based at least partly on the same primary video streams, all such participant clients 121 will be active in the same video communication, but in different "time zones" in relation to each other. In other words, a respective timeline for produced video stream consumption may be time-wise offset between different groups 121', 121", 121'".

For instance, some production steps (such as 135', 135'") may be direct (without the use of any deliberately introduced time-delay) and/or involve only computationally relatively lightweight processing before provision for publication; whereas other production steps (such as 135") may involve a deliberately introduced time-delay and/or relatively heavy-weight processing leading to the produced digital video stream in question being produced for earliest publication at a delay in relation to an earliest delay for publication of the respective digital video streams of the former production steps 135', 135'".

Hence, each participating client 121 in one or several of said groups 121', 121", 121'" may be able to interact with each other at the same perceived time-delay. At the same time, groups being associated with a larger respective time-delay may use a produced video stream from a group with a smaller time-delay as an input video stream to be used when producing an output video stream that the larger time-delay group views in their later "time-zone".

The result of this first larger time-delay production, e.g. performed by the production function 135", is hence a produced digital video stream of the above-described type, that may for instance visually comprise one or several of the primary video streams in question, in processed or non-processed form, as sub-parts. This produced video stream in question may comprise live-captured video streams, slides, externally provided video or imagery, and so forth, as generally described above in relation to video output streams produced by the central server 130. The produced video stream in question may also be produced based on detected events and/or patterns of deliberately delayed or real-time input primary video streams, provided by participant clients 121, in the general way described above.

In an illustrative example, the first group 121' participant clients are part of a debate panel, communicating using the video communication service 110 at a relative low latency, each one of these participant clients continuously being fed produced video stream from publishing function 136' (or the respective primary video stream of each other). An audience to the debate panel is constituted by the second group 121" participant clients, continuously being fed the produced video stream from production step 135", in turn being associated with a slightly higher latency. The produced video stream from production step 135" may be automatically produced, in the general manner discussed above, to automatically shift between views of individual debate panel speakers (participant clients allocated to the first group 121', such views being provided directly from the collection function 131) and a produced view showing all debate panel speakers (this view being the first produced video stream). Hence, the audience can receive a well-produced experience while the panel speakers may interact with each other at minimum latency.

The delay deliberately added to the respective primary video streams used by the production function 136" may be at least 0.1 s, such as at least 0.2 s, such as least 0.5 s; and may be at the most 5 s, such as at the most 2 s, such as at the most 1 s. It may also depend on an inherit latency associated with each respective primary video stream, so as to achieve a full time-synchronisation between each of the used primary video streams and also the produced video stream incoming to production step 135" from production step 135'.

It is understood that the primary video streams in question, as well as the produced video stream from production step 135', may all be additionally deliberately delayed so as to improve pattern detection for use in the second production function 135" in the general way described above.

In view of the variations, embodiments, and examples, above, a few exemplifying, non-exhaustive, scenarios are listed here. In the scenarios below, the term "convert" may refer to conversion of a video into a video with a desired frame rate and/or a desired resolution, e.g. including receiving the video, retrieval of video frames, generation of generated video frame, and the like. Accordingly, the conversion is described herein with reference to the first and/or second aspects. Furthermore, the term "convert" may refer to conversion of a file, such as webpage, a document, a spreadsheet, a pdf-file, or the like as described in some embodiments herein, e.g. according to examples of the third aspect herein.

A file/video is converted and shared, e.g. by a user or triggered as described herein, in a collaboration session. The converted file/video may be shared to a particular time-zone of the collaboration session. When the converted file/video is saved, it may then in a later collaboration session be shared again, e.g. by a user with or without capability for interaction by any further participants in the collaboration session. Furthermore, the converted video may be used as a primary steam for production of a secondary steam.

A file/video is converted and e.g. shared in a particular time-zone of a collaboration session. Then, the converted file/video may be shared, e.g. by the user with or without capability for interaction by any further participants in the collaboration session (using e.g. LiveShare).

A file/video is converted and e.g. shared in a particular time-zone of a collaboration session. The converted file/video (i.e. being a video) may then be fed into a production function with/without deliberate delay. Next, the thus produced video stream may be shared, e.g. by a user with or without capability for interaction by any further participants in the same or another collaboration session in the same or a different time-zone.

Not only videos stored in the storage function, e.g. cloud storage etc., can be converted by some of the embodiments herein. A primary stream may be converted to obtain the converted video, e.g. according to the first and second aspects. Next, the converted video may be forwarded to a production function with one or more further primary streams. Alternatively or additionally, the converted video may then be shared, by a user with or without capability for interaction by any further participant in the collaboration session. As a further option or addition, the converted video may be saved, e.g. for future use as described herein.

Referring to the preceding bullet, a plurality of primary streams may result, e.g. by use of the production function, in a produced stream. The thus produced stream may be converted, e.g. according to the first and/or second aspects herein. This produced stream may then be fed into a further production function, be shared by a user with or without capability for interaction by any further participant in the collaboration session, saved, or the like.

In the following description and with reference to FIG. 13 through FIG. 17, the aspects and embodiments herein are summarized. The same reference numerals have been used to denote the same or corresponding features in the various examples.

Figure 13:
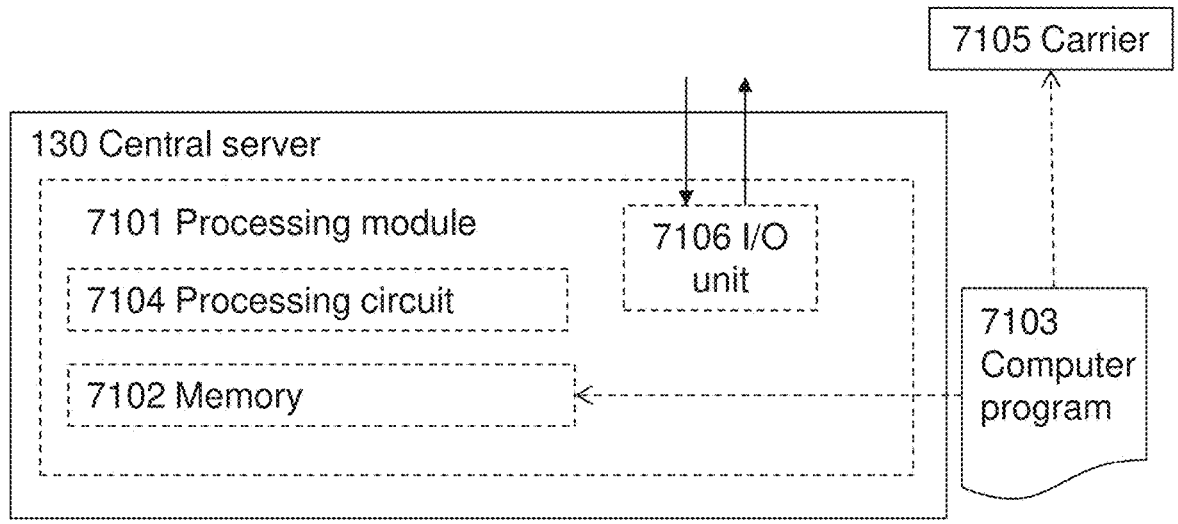
FIG. 13 to FIG. 17 are block diagrams illustrating embodiments herein.

In FIG. 13, a schematic block diagram of examples of the central server 130 is shown.

The central server 130 may comprise a processing module 7101, such as a means for performing the methods described herein. The means may be embodied in the form of one or more hardware modules and/or one or more software modules. The term "module" may thus refer to a circuit, a software block or the like according to various embodiments as described below.

The central server 130 may further comprise a memory 7102. The memory may comprise, such as contain or store, instructions, e.g. in the form of a computer program 7103, which may comprise computer readable code units.

According to some embodiments herein, the central server 130 and/or the processing module 7101 comprises a processing circuit 7104 as an exemplifying hardware module, which may comprise one or more processors. Accordingly, the processing module 7101 may be embodied in the form of, or 'realized by', the processing circuit 7104. The instructions may be executable by the processing circuit 7104, whereby the central server 130 is operative to perform corresponding operations as described herein. As another example, the instructions, when executed by the central server 130 and/or the processing circuit 7104, may cause the central server 130 to perform operations performed by the central server 130 as described herein. In view of the above, in one example, there is provided a central server 130. Again, the memory 7102 contains the instructions executable by said processing circuit 7104 whereby the central server 130 is operative to perform the operations herein.

FIG. 13 further illustrates a carrier 7105, or program carrier, which provides, such as comprises, mediates, supplies and the like, the computer program 7103 as described directly above. The carrier 7105 may be one of an electronic signal, an optical signal, a radio signal and a computer readable medium.

In some embodiments, the processing module 7101 may comprise one or more modules, each arranged to perform one or more of the operations described herein.

The term "module" may refer to a circuit when the term "module" refers to a hardware module. In other examples, one or more of the aforementioned exemplifying hardware modules may be implemented as one or more software modules.

Moreover, the central server 130 and/or the processing module 7101 may comprise an Input/Output module 7106, which may be exemplified by a receiving module and/or a sending module when applicable.

Therefore, according to the various examples described above, the central server 130 and/or the processing module 7101 is configured to perform the operations described herein.

Figure 14:
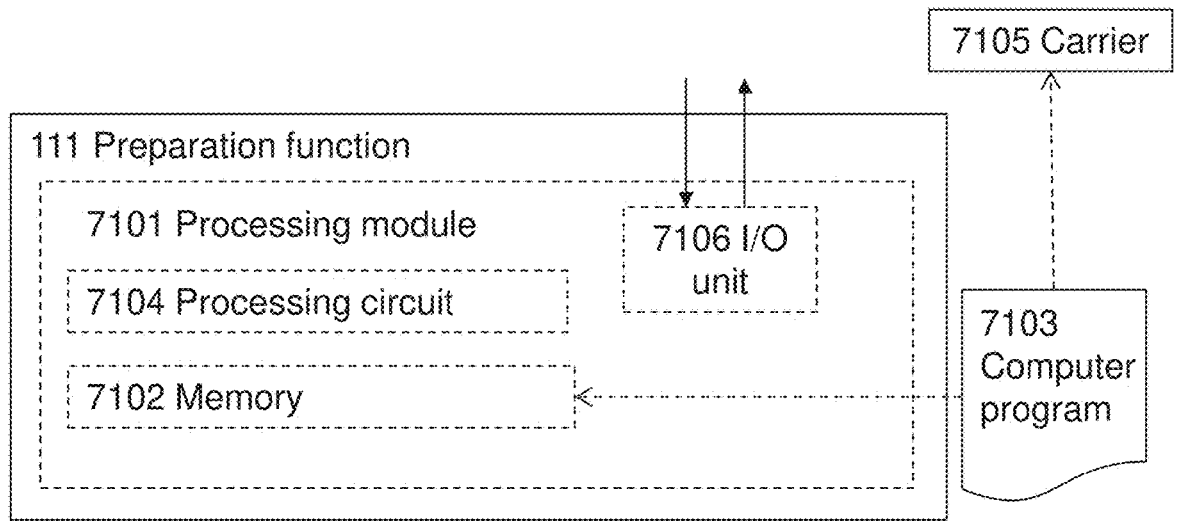

In FIG. 14, a schematic block diagram of examples of the preparation function 111 is shown.

The preparation function 111 may comprise a processing module 7101, such as a means for performing the methods described herein. The means may be embodied in the form of one or more hardware modules and/or one or more software modules. The term "module" may thus refer to a circuit, a software block or the like according to various embodiments as described below.

The preparation function 111 may further comprise a memory 7102. The memory may comprise, such as contain or store, instructions, e.g. in the form of a computer program 7103, which may comprise computer readable code units.

According to some embodiments herein, the preparation function 111 and/or the processing module 7101 comprises a processing circuit 7104 as an exemplifying hardware module, which may comprise one or more processors. Accordingly, the processing module 7101 may be embodied in the form of, or 'realized by', the processing circuit 7104. The instructions may be executable by the processing circuit 7104, whereby the preparation function 111 is operative to perform corresponding operations as described herein. As another example, the instructions, when executed by the preparation function 111 and/or the processing circuit 7104, may cause the preparation function 111 to perform operations performed by the preparation function 111 as described herein.

In view of the above, in one example, there is provided a preparation function 111. Again, the memory 7102 contains the instructions executable by said processing circuit 7104 whereby the preparation function 111 is operative to perform the operations herein.

FIG. 14 further illustrates a carrier 7105, or program carrier, which provides, such as comprises, mediates, supplies and the like, the computer program 7103 as described directly above. The carrier 7105 may be one of an electronic signal, an optical signal, a radio signal and a computer readable medium.

In some embodiments, the processing module 7101 may comprise one or more modules, each arranged to perform one or more of the operations described herein. The term "module" may refer to a circuit when the term "module" refers to a hardware module. In other examples, one or more of the aforementioned exemplifying hardware modules may be implemented as one or more software modules.

Moreover, the preparation function 111 and/or the processing module 7101 may comprise an Input/Output module 7106, which may be exemplified by a receiving module and/or a sending module when applicable.

Therefore, according to the various examples described above, the preparation function 111 and/or the processing module 7101 is configured to perform the operations described herein.

Figure 15:
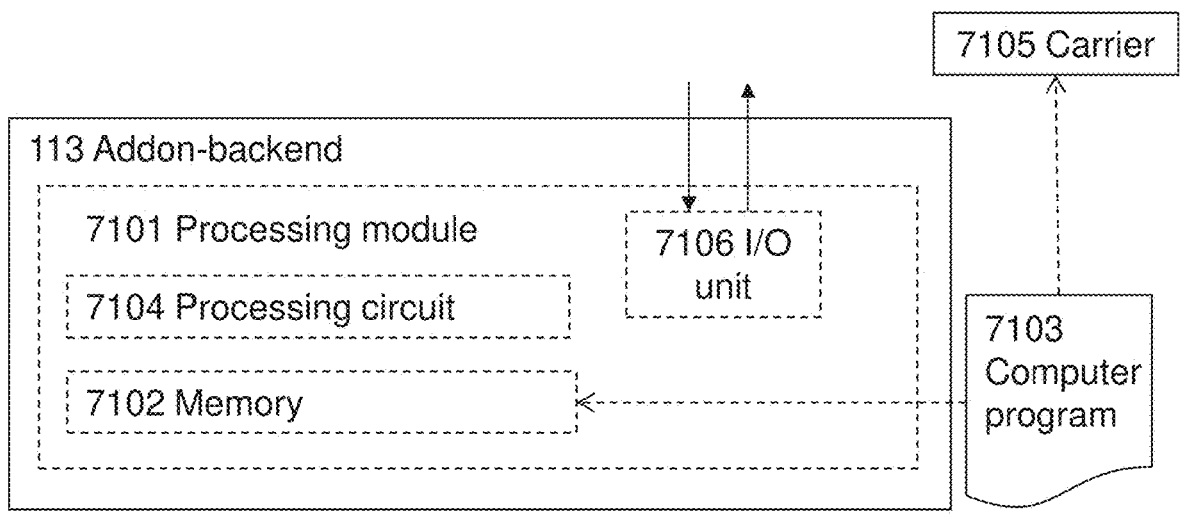

In FIG. 15, a schematic block diagram of examples of the addon-backend 113 is shown.

The addon-backend 113 may comprise a processing module 7101, such as a means for performing the methods described herein. The means may be embodied in the form of one or more hardware modules and/or one or more software modules. The term "module" may thus refer to a circuit, a software block or the like according to various embodiments as described below.

The addon-backend 113 may further comprise a memory 7102. The memory may comprise, such as contain or store, instructions, e.g. in the form of a computer program 7103, which may comprise computer readable code units.

According to some embodiments herein, the addon-backend 113 and/or the processing module 7101 comprises a processing circuit 7104 as an exemplifying hardware module, which may comprise one or more processors. Accordingly, the processing module 7101 may be embodied in the form of, or 'realized by', the processing circuit 7104. The instructions may be executable by the processing circuit 7104, whereby the addon-backend 113 is operative to perform corresponding operations as described herein. As another example, the instructions, when executed by the addon-backend 113 and/or the processing circuit 7104, may cause the addon-backend 113 to perform operations performed by the addon-backend 113 as described herein.

In view of the above, in one example, there is provided an addon-backend 113. Again, the memory 7102 contains the instructions executable by said processing circuit 7104 whereby the addon-backend 113 is operative to perform the operations herein.

FIG. 15 further illustrates a carrier 7105, or program carrier, which provides, such as comprises, mediates, supplies and the like, the computer program 7103 as described directly above. The carrier 7105 may be one of an electronic signal, an optical signal, a radio signal and a computer readable medium.

In some embodiments, the processing module 7101 may comprise one or more modules, each arranged to perform one or more of the operations described herein.

The term "module" may refer to a circuit when the term "module" refers to a hardware module. In other examples, one or more of the aforementioned exemplifying hardware modules may be implemented as one or more software modules.

Moreover, the addon-backend 113 and/or the processing module 7101 may comprise an Input/Output module 7106, which may be exemplified by a receiving module and/or a sending module when applicable.

Therefore, according to the various examples described above, the addon-backend 113 and/or the processing module 7101 is configured to perform the operations described herein.

Figure 16:
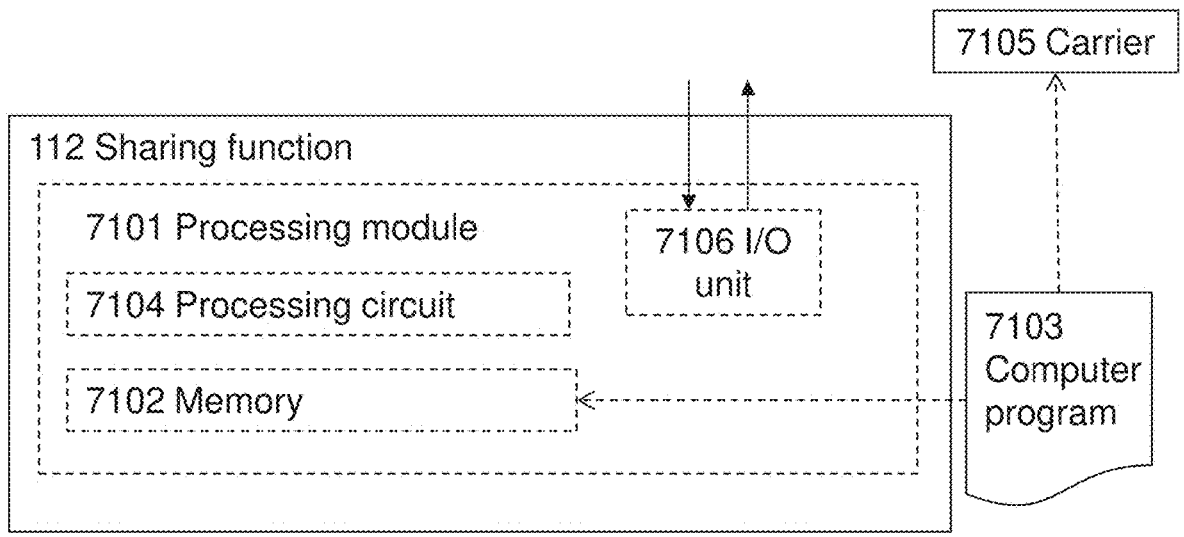

In FIG. 16, a schematic block diagram of examples of the sharing function 112 is shown.

The sharing function 112 may comprise a processing module 7101, such as a means for performing the methods described herein. The means may be embodied in the form of one or more hardware modules and/or one or more software modules. The term "module" may thus refer to a circuit, a software block or the like according to various embodiments as described below.

The sharing function 112 may further comprise a memory 7102. The memory may comprise, such as contain or store, instructions, e.g. in the form of a computer program 7103, which may comprise computer readable code units.

According to some embodiments herein, the sharing function 112 and/or the processing module 7101 comprises a processing circuit 7104 as an exemplifying hardware module, which may comprise one or more processors. Accordingly, the processing module 7101 may be embodied in the form of, or 'realized by', the processing circuit 7104. The instructions may be executable by the processing circuit 7104, whereby the sharing function 112 is operative to perform corresponding operations as described herein. As another example, the instructions, when executed by the sharing function 112 and/or the processing circuit 7104, may cause the sharing function 112 to perform operations performed by the sharing function 112 as described herein.

In view of the above, in one example, there is provided a sharing function 112. Again, the memory 7102 contains the instructions executable by said processing circuit 7104 whereby the sharing function 112 is operative to perform the operations herein.

FIG. 16 further illustrates a carrier 7105, or program carrier, which provides, such as comprises, mediates, supplies and the like, the computer program 7103 as described directly above. The carrier 7105 may be one of an electronic signal, an optical signal, a radio signal and a computer readable medium.

In some embodiments, the processing module 7101 may comprise one or more modules, each arranged to perform one or more of the operations described herein.

The term "module" may refer to a circuit when the term "module" refers to a hardware module. In other examples, one or more of the aforementioned exemplifying hardware modules may be implemented as one or more software modules.

Moreover, the sharing function 112 and/or the processing module 7101 may comprise an Input/Output module 7106, which may be exemplified by a receiving module and/or a sending module when applicable.

Therefore, according to the various examples described above, the sharing function 112 and/or the processing module 7101 is configured to perform the operations described herein.

Figure 17:
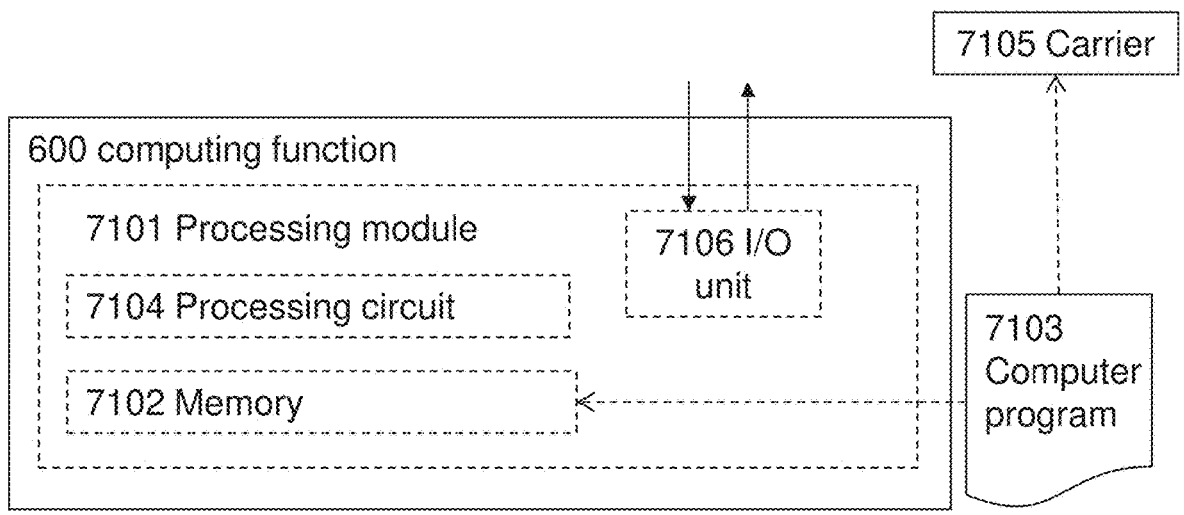

In FIG. 17, a schematic block diagram of examples of the computing function 600, such as a computer, a server, a virtual machine or the like, is shown.

The computing function 600 may comprise a processing module 7101, such as a means for performing the methods described herein. The means may be embodied in the form of one or more hardware modules and/or one or more software modules. The term "module" may thus refer to a circuit, a software block or the like according to various embodiments as described below.

The computing function 600 may further comprise a memory 7102. The memory may comprise, such as contain or store, instructions, e.g. in the form of a computer program 7103, which may comprise computer readable code units.

According to some embodiments herein, the computing function 600 and/or the processing module 7101 comprises a processing circuit 7104 as an exemplifying hardware module, which may comprise one or more processors. Accordingly, the processing module 7101 may be embodied in the form of, or 'realized by', the processing circuit 7104. The instructions may be executable by the processing circuit 7104, whereby the computing function 600 is operative to perform corresponding operations as described herein. As another example, the instructions, when executed by the computing function 600 and/or the processing circuit 7104, may cause the computing function 600 to perform operations performed by the computing function 600 as described herein.

In view of the above, in one example, there is provided a computing function 600. Again, the memory 7102 contains the instructions executable by said processing circuit 7104 whereby the computing function 600 is operative to perform the operations herein.

FIG. 17 further illustrates a carrier 7105, or program carrier, which provides, such as comprises, mediates, supplies and the like, the computer program 7103 as described directly above. The carrier 7105 may be one of an electronic signal, an optical signal, a radio signal and a computer readable medium.

In some embodiments, the processing module 7101 may comprise one or more modules, each arranged to perform one or more of the operations described herein.

The term "module" may refer to a circuit when the term "module" refers to a hardware module. In other examples, one or more of the aforementioned exemplifying hardware modules may be implemented as one or more software modules.

Moreover, the computing function 600 and/or the processing module 7101 may comprise an Input/Output module 7106, which may be exemplified by a receiving module and/or a sending module when applicable.

Therefore, according to the various examples described above, the computing function 600 and/or the processing module 7101 is configured to perform the operations described herein.

As used herein, the term "frame" may typically refer to frames of a video stream, which comprises one or more streams of different types. Thus, the term "frame" may refer to a video frame, an audio frame or the like, as understood from the context in which the term is used. As an example, a frame may be an uncompressed, decoded map of pixels.

As used herein, the term "ticks" may refer to a unit of time measurement used by a computer's clock or operating system. A tick is typically the smallest unit of time that the operating system or processor can measure, and it is often used as a basis for scheduling tasks, allocating system resources and measuring time. For example, the tick may be incremented every millisecond, and the operating system may use this tick to track the amount of time each process has been running and to schedule tasks accordingly.

In some contexts, "tick" might also refer to a specific type of software interrupt used by the operating system to handle hardware events or perform specific tasks. These interrupts are often triggered by the computer's hardware clock, which generates a signal at a regular interval.

As used herein, the term "function", such as the central server, the preparation function, the sharing function, the storage function and the like, refers to a computer-implemented functionality that is arranged to be accessed in a logically centralised manner, such as via an API (Application Programming Interface). The functionality may be implemented purely in computer software, or in a combination of software with virtual and/or physical hardware. It may be implemented on a standalone physical or virtual server computer or be distributed across several interconnected physical and/or virtual server computers.

As used herein, the term "addon", "addon software", "addin", "plugin", "addon software function", or the like, may refer to a piece of software that is loaded, preferably dynamically loaded, into the client function, e.g. as code running in a so called iframe embedded into the client function. The addon is typically added to a collaboration session. This causes a respective instance of the synchronization addon to execute in all participants of the collaboration session. Use of addons is well-known and documented in related literature.

As used herein, the term "computer program carrier", "program carrier", or "carrier", may refer to one of an electronic signal, an optical signal, a radio signal, and a computer readable medium. In some examples, the computer program carrier may exclude transitory, propagating signals, such as the electronic, optical and/or radio signal. Thus, in these examples, the computer program carrier may be a non-transitory carrier, such as a non-transitory computer readable medium.

As used herein, the term "processing module" may include one or more hardware modules, one or more software modules or a combination thereof. Any such unit, be it a hardware, software or a combined hardware-software module, may be a determining means, estimating means, capturing means, associating means, comparing means, identification means, generating means, retrieving means, receiving means, sending means, obtaining means or the like as disclosed herein. As an example, the expression "means" may be a module corresponding to the modules listed above in conjunction with the Figures.

As used herein, the term "software module" may refer to a software application, a Dynamic Link Library (DLL), a software component, a software container, a software object, an object according to Component Object Model (COM), a software function, a virtual machine, a software engine, an executable binary software file or the like.

As used herein, the term "backend", "addon-backend", or the like, may refer to a server function, a server-side function, or the like, associated with an addon. The backend and addon are configured to cooperate and communicate with each other as described herein with reference to the accompanying drawings.

The terms "processing circuit" may herein encompass a processing unit, comprising e.g. one or more processors, an Application Specific Integrated Circuit (ASIC), a Field-Programmable Gate Array (FPGA) or the like. The processing circuit or the like may comprise one or more processor kernels.

As used herein, the term "local storage" may refer to a computer readable and/or writable medium, such as a harddrive, a solid state drive, a magnetic tape, a harddisc, or the like, that is located in close proximity of a present device, for example connected by a short-range wired or wireless technology, within a casing of the present device or the like.

As used herein, the term "remote storage" may refer to a computer readable and/or writable medium, such as a harddrive, a solid state drive, a magnetic tape, a harddisc, a cloud storage function, an online storage service, or the like, that is located at a distance from the present device, for example connected by a long-range wired or wireless technology, sometimes in a data centre or the like.

As used herein, the expression "configured to/for" may mean that a processing circuit is configured to, such as adapted to or operative to, by means of software configuration and/or hardware configuration, perform one or more of the actions described herein.

As used herein, the term "action" may refer to an action, a step, an operation, a response, a reaction, an activity or the like. It shall be noted that an action herein may be split into two or more sub-actions as applicable. Moreover, also as applicable, it shall be noted that two or more of the actions described herein may be merged into a single action.

As used herein, the term "memory" may refer to a hard disk, a magnetic storage medium, a portable computer diskette or disc, flash memory, random access memory (RAM) or the like. Furthermore, the term "memory" may refer to an internal register memory of a processor or the like.

As used herein, the term "input unit" may refer to a keyboard, a mouse, a tracepad, a stylus, a touch screen, or the like.

As used herein, the term "output unit" may refer to a computer screen, liquid crystal display, a printer, a projecting device for projecting a computers graphical user interface on a flat surface, such as a wall, or the like, and other commonly used computer output devices.

As used herein, the expression "more, less or same number of video frames" may be considered per unit time, per an entire video, per a particular portion of the video or the like.

As used herein, the terms "message", "msg", or the like, may refer to any information provided, such as sent or the like, by one entity, function, device etc., for consumption, such as reception, or the like, by another entity. The message may have any suitable format, with or without headers or the like. The message may for example be a binary bit, a value, a string, an object, a javascript notation object, a formatted array of bits, a formatted string, a file, or the like.

As used herein, the term "computer readable medium" may be a Universal Serial Bus (USB) memory, a Digital Versatile Disc (DVD), a Blu-ray disc, a software unit that is received as a stream of data, a Flash memory, a hard drive, a memory card, such as a MemoryStick, a Multimedia Card (MMC), Secure Digital (SD) card, etc. One or more of the aforementioned examples of computer readable medium may be provided as one or more computer program products.

As used herein, the term "computer readable code units" may be text of a computer program, parts of or an entire binary file representing a computer program in a compiled format or anything there between.

As used herein, the terms "first", "second", "third" etc. may have been used merely to distinguish features, apparatuses, elements, units, or the like from one another, unless otherwise evident from the context.

Whenever the word "resolution" is mentioned, this can refer to a certain number of total pixels in one or several dimensions in an image coordinate system, and/or a certain number of pixels in relation to some other coordinate system, such as a screen coordinate system or a coordinate system measuring physical space in conventional units of length. Hence, the "resolution" of an image can be, for instance, "100×200 pixels" or "300 pixels per inch".

Any feature described with reference to one or some examples may be readily combined with any other one or more examples when applicable.

The embodiments herein are merely provided as examples and are not intended to limit the scope of protection, which is defined by the appended set of claims.

LISTING OF EXAMPLES ACCORDING TO THE FIRST ASPECT

1. A method, performed by a system (100), for managing sharing of a video in a collaboration session, in which at least two client devices (121,122) are participating, wherein the system (100) comprises the two client devices (121) and a central server (130) capable of hosting the collaboration session, wherein a video file, representing the video and being stored in a storage function (140), is accessible by the central server (130), wherein the video is to be shared as a shared video stream with a desired resolution and a desired frame rate, wherein the method comprises:
    receiving (B120), by the central server (130), a request for sharing of the video in the collaboration session,
    obtaining (B122), by the central server (130), a synchronization time stamp of an audio frame, relating to the collaboration session, to be used for synchronizing the shared video stream with the collaboration session,
    in a determination step (B124), determining (B124), by the central server (130) and based on a video frame rate difference between the desired frame rate and a source frame rate of the video file, whether more, less or same number of video frames as in the video file are needed in the shared video stream,
    setting up (B130), by the central server (130), a buffer for provision of the shared video stream to the collaboration session, wherein the buffer is capable of buffering at the most a limited number of video frames that corresponds to a time interval of less than one second,
    iteratively retrieving (B140), by the central server (130), video frame by video frame of the video file, and
    for each video frame, the method comprises:
    generating (B150), by the central server (130), zero, one or more video frames according to the determination step (B124) based on said each iteratively retrieved video frame, while setting a respective time stamp of said one or more generated video frames based on the synchronization time stamp, wherein said one or more generated frames have the desired resolution and the respective time stamp corresponds to the desired frame rate,
    wherein the method comprises:
    providing (B160), by the central server (130) and to the two client devices (121) participating in the collaboration session, the shared video stream by inserting said one or more generated video frames into the buffer.

2. The method according to example 1, wherein the method comprises:
    obtaining (C130), by the central server (130), information about the desired resolution and the desired frame rate for a shared video stream representing the video to be shared.

3. The method according to any one of the preceding examples, wherein the method comprises:
    in a further determination (B126) step, determining (B126), by the central server (130) and based on a further video frame rate difference between a further desired frame rate and a source frame rate of the video file, whether more, less or same number of video frames as in the video file are needed in the shared video stream,
    wherein the method comprises, for each iteratively retrieved video frame:
    in a further generation step (D160), generating, by the central server (130), zero, one or more video frames according to the further determination step (B126) based on said each iteratively retrieved video frame, while setting a further respective time stamp of said one or more generated video frames based on the synchronization time stamp, wherein said one or more generated frames have the further desired resolution and the respective time stamp corresponds to the further desired frame rate,
    providing (C197), by the central server (130), the second video stream by sending the respective further video frame to a destination function (150).

4. The method according to any one of the preceding examples, wherein the method comprises:
    obtaining (C190) an update message instructing the central server (130) to set the desired video frame rate and the desired resolution according to information comprised in the message, whereby an updated desired video frame rate and an updated desired resolution is obtained.

5. A central server (130) configured for performing the operations performed by the central server (130) in the method according to any one of examples 1-4.

6. A computer program (7103), comprising computer readable code units which when executed on a central server (130) causes the central server (130) to perform the operations performed by the central server (130) in the method according to any one of examples 1-4.

7. A carrier (7105) comprising the computer program according to the preceding example, wherein the carrier (7105) is one of an electronic signal, an optical signal, a radio signal, a computer readable medium and a computer program product.

LISTING OF EXAMPLES ACCORDING TO THE THIRD ASPECT

1. A computer-implemented method for managing a file, wherein the method comprises:
    opening (E110) the file by means of a rendering function (610) to render at least a portion of the file as an image,
    obtaining (E120) one or more event messages,
    wherein the method comprises, for each event message of said one or more event messages:
    obtaining (E130), from the rendering function (610), an image for each event message, wherein the image represents a rendered portion of the file, wherein the image is associated with a sequence indication,
    generating (E140) metadata based on the event message and the sequence indication,
    providing (E150) the metadata, and
    providing (E160) a video comprising a set of images, wherein the set of images comprises the image for said each event message, wherein the video is a representation of the file.
2. The method according to example 1, wherein the method is performed by a client device (121), wherein a system (100) comprises the client device (121) and a video communication service (110), wherein the video communication service (110) hosts a collaboration session joined by the client device (121).
3. The method according to example 1 or 2, wherein said one or more event messages is received from the rendering function (610), and wherein said one or more event messages relates to changes in the image rendered by the rendering function (610), e.g. due to input events providable by a user-input device.
4. The method according to any one of the preceding examples, wherein the method comprises:
simulating (E111) said one or more event messages by generating input events that change the image rendered by the rendering function (610).
5. The method according to any one of the preceding examples, wherein input events originate from actual interaction with the rendered file by the user using the user-input device, such as a mouse, a keyboard, a trace pad, or the like.
6. The method according to any one of the preceding examples, wherein the method comprises:
repeatedly capturing (E112) images by the rendering function (610), and when a difference is detected between two consecutively captured images, generating (E118) an event message of said one or more event messages, wherein the event message indicates that the two consecutively captured images are different from each other.
7. The method according to any one of the preceding examples, wherein the method comprises:
repeatedly capturing (E112) images by the rendering function (610), and
when a difference is not detected between two consecutively captured images, generating (E118) an event message of said one or more event messages, wherein the event message indicates that the two consecutively captured images are similar to each other.
8. The method according to any one of the preceding examples, wherein said one or more event messages comprises an indication to start a sequence of repeatedly capturing images by means of the rendering function (610) or an indication to stop the repeatedly capturing of images by means of the rendering function (610), wherein the method comprises:
when obtaining the indication to start, repeatedly capturing (E135) images by means of the rendering function (610), and
generating (E140) metadata based on the event message and a respective sequence indication for each captured image, until the indication to stop is obtained.
9. The method according to any one of the preceding examples, wherein the method comprises:
receiving (E115) an audio stream of the collaboration session from the video communication service (110), detecting (E117) a key word in the audio stream, and generating (E118) an event message of said one or more event messages based on the key word.
10. A computing function (600) configured for performing the method according to any one of examples 1-9.
11. A computer program (7103), comprising computer readable code units which when executed on a computing function (600) causes the computing function (600) to perform the method according to any one of examples 1-9.
12. A carrier (7105) comprising the computer program according to the preceding example, wherein the carrier (7105) is one of an electronic signal, an optical signal, a radio signal, a computer readable medium and a computer program product.

The invention claimed is:

1. A method, performed by a system, for managing sharing of a video in a collaboration session, in which at least two client devices are participating, wherein the system comprises a video communication service capable of hosting the collaboration session, two client functions, executable on a respective one of the two client devices, two addon functions associated with a respective client function of said two client functions, an addon-backend function configured to cooperate and communicate with the two addon functions, and a sharing function configured to cooperate and communicate with the addon-backend function and to participate in the collaboration session, wherein a video file, representing the video and being stored in a storage function, is accessible by the sharing function, wherein the video is going to be shared as a shared video stream with a desired resolution and a desired frame rate, wherein the method comprises:
receiving, by the addon-backend function, a request for sharing of the video in the collaboration session,
connecting the sharing function to the collaboration session,
obtaining, by the sharing function, a synchronization time stamp of an audio frame of the collaboration session, wherein the audio frame is going to be used for synchronizing the shared video stream with the collaboration session,
determining, by the sharing function and based on a video frame rate difference between the desired frame rate and a source frame rate of the video file, whether more, less or same number of video frames as in the video file are needed in the shared video stream,
iteratively retrieving, by the sharing function, video frames from the video file stored in the storage function, and
for each iteratively retrieved video frame, the method comprises:
generating zero, one or more video frames based on said each iteratively retrieved video frame according to the determination step, while setting a respective time stamp of said one or more generated video frames based on the synchronization time stamp, wherein said one or more generated frames have the desired resolution and the respective time stamp corresponds to the desired frame rate,
wherein the method comprises:
providing, by the sharing function, the shared video stream by sending said one or more generated video frames to the video communication service, and
providing, by the video communication service, the shared video stream to the two client devices participating in the collaboration session.
2. The method of claim 1, wherein the method comprises:
obtaining, by the sharing function, information about the desired resolution and the desired frame rate for a shared video stream representing the video is to be shared.

3. A method, comprising:
connecting a sharing function to a collaboration session, hosted by a video communication service,
obtaining a synchronization time stamp of an audio frame of the collaboration session, wherein the audio frame is going to be used for synchronizing a shared video stream with the collaboration session, wherein a video file, representing a video and being stored in a storage function, is accessible by the sharing function, wherein the video is going to be shared as the shared video stream with a desired resolution and a desired frame rate,
determining, based on a video frame rate difference between the desired frame rate and a source frame rate of the video file, whether more, less or same number of video frames as in the video file are needed in the shared video stream,
iteratively retrieving video frames from the video file stored in the storage function, and
wherein the sharing function is configured for, for each iteratively retrieved video frame:
generating zero, one or more video frames based on said each iteratively retrieved video frame according to the determination step, while setting a respective time stamp of said one or more generated video frames based on the synchronization time stamp, wherein said one or more generated frames have the desired resolution and the respective time stamp corresponds to the desired frame rate,
wherein the sharing function is configured for:
providing the shared video stream by sending said one or more generated video frames to the video communication service.

4. A computer program product, comprising a non-transitory, computer readable medium having stored thereon code units which when executed on a sharing function causes the sharing function to perform a method comprising:
connecting to a collaboration session, hosted by a video communication service,
obtaining a synchronization time stamp of an audio frame of the collaboration session, wherein the audio frame is going to be used for synchronizing a shared video stream with the collaboration session, wherein a video file, representing a video and being stored in a storage function, is accessible by the sharing function, wherein the video is going to be shared as the shared video stream with a desired resolution and a desired frame rate,
determining, based on a video frame rate difference between the desired frame rate and a source frame rate of the video file, whether more, less or same number of video frames as in the video file are needed in the shared video stream,
iteratively retrieving video frames from the video file stored in the storage function, and
wherein the method comprises, for each iteratively retrieved video frame:
generating zero, one or more video frames based on said each iteratively retrieved video frame according to the determination step, while setting a respective time stamp of said one or more generated video frames based on the synchronization time stamp, wherein said one or more generated frames have the desired resolution and the respective time stamp corresponds to the desired frame rate,
wherein the method comprises:
providing the shared video stream by sending said one or more generated video frames to the video communication service.

\* \* \* \* \*